United States Patent
Bourbonnais et al.

(10) Patent No.: US 9,104,342 B2
(45) Date of Patent: Aug. 11, 2015

(54) TWO STAGE CHECKSUMMED RAID STORAGE MODEL

(75) Inventors: Roch Bourbonnais, Corenc (FR); Blaise Sanouillet, Rickmansworth (GB)

(73) Assignee: Oracle International Corporation, Redwood Shores, CA (US)

( * ) Notice: Subject to any disclaimer, the term of this patent is extended or adjusted under 35 U.S.C. 154(b) by 290 days.

(21) Appl. No.: 13/880,319

(22) PCT Filed: Oct. 21, 2010

(86) PCT No.: PCT/IB2010/003263
§ 371 (c)(1),
(2), (4) Date: May 30, 2013

(87) PCT Pub. No.: WO2012/052800
PCT Pub. Date: Apr. 26, 2012

(65) Prior Publication Data
US 2013/0246707 A1    Sep. 19, 2013

(51) Int. Cl.
*G06F 3/06* (2006.01)
*G06F 11/10* (2006.01)

(52) U.S. Cl.
CPC .......... *G06F 3/0689* (2013.01); *G06F 11/1076* (2013.01); *G06F 2211/109* (2013.01)

(58) Field of Classification Search
CPC .............. G06F 11/1076; G06F 3/0689; G06F 2211/109
See application file for complete search history.

(56) References Cited

U.S. PATENT DOCUMENTS

| | | | |
|---|---|---|---|
| 5,948,110 A * | 9/1999 | Hitz et al. | 714/6.22 |
| 6,728,922 B1 * | 4/2004 | Sundaram et al. | 714/769 |
| 7,526,622 B1 * | 4/2009 | Bonwick et al. | 711/162 |
| 8,209,587 B1 * | 6/2012 | Taylor et al. | 714/770 |
| 8,364,985 B1 * | 1/2013 | Subramanian et al. | 713/193 |
| 2004/0177218 A1 * | 9/2004 | Meehan et al. | 711/114 |
| 2006/0047993 A1 | 3/2006 | Benhase et al. | |
| 2006/0080505 A1 | 4/2006 | Arai et al. | |
| 2007/0124659 A1 | 5/2007 | Moore et al. | |

FOREIGN PATENT DOCUMENTS

WO    02/071230 A1    9/2002

OTHER PUBLICATIONS

International Preliminary Report on Patentability issued in PCT/IB2010/003263 mailed Apr. 23, 2013 (7 pages).
"Jeff Bonwick's Blog"; http://blogs.sun.com/bonwick/entry/raid_z; Accessed on Mar. 10, 2014 (4 pages).
"When to (and not to) Use Raid Z"; http://blogs.sun.com/roch/entry/when_to_and_not_to; Accessed on Mar. 10, 2014 (5 pages).
International Search Report issued in PCT/IB2010/003263 mailed on May 12, 2011 (3 pages).
Written Opinion of the International Searching Authority issued in PCT/IB2010/003263 mailed on May 12, 2011 (7 pages).

* cited by examiner

*Primary Examiner* — Hiep Nguyen
(74) *Attorney, Agent, or Firm* — Osha Liang LLP

(57) ABSTRACT

A method for writing a logical data block to storage. The method includes receiving a request to write a logical data block to a storage pool, allocating a number of physical log blocks in a RAID log and a parity block for the logical data block, and writing the logical data block and the parity block to the physical log blocks. The number of the physical log blocks are less than a number of disks storing the RAID log. The method further includes allocating space in a physical slab block in a RAID slab for the logical data block, copying data including the logical data block to the space in the physical slab block, and updating, in the RAID slab, a checksum corresponding to the physical slab block and a parity block that includes the data stripe having the physical slab block based on the data copied.

20 Claims, 13 Drawing Sheets

TWO STAGE CHECKSUMMED RAID STORAGE MODEL

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

Data stored as files in a file system may be protected using one or more redundancy schemes. Redundancy schemes are typically used to enable recover data in the event of file system failures, data corruption, etc. Data redundancy ensures continuous availability and protection of data stored on disk. The follow is a non-exclusive list of common redundancy schemes: redundant arrays of independent disks (RAID) schemes, 2-way mirroring, 3-way mirroring, etc.

There are many RAID schemes currently available. One common RAID scheme is RAID-5. In general, RAID-5 is used to replicate data across multiple physical disks organized in an array. More specifically, the physical disks in the data storage system are typically segmented into blocks of data space. A block may comprise any appropriate number of bytes of data (e.g., 512 bytes, 1024 bytes, etc.). In RAID-5, data to be stored is divided into data blocks and the resulting data blocks are XOR'd to obtain a parity block. The parity block corresponds to a block that is used to recover part of the data in the event that the disk, upon which the data block is stored, fails. The data blocks and the parity block are written to the multiple disks by striping the data blocks across the multiple disks.

The following is a brief example, illustrating the operation of RAID-5. Initially, a request is received to write data to the disk. Assuming that there are five disks in the system, the data to be written is divided into data blocks. Further, one parity block is to be created for each set of four data blocks. The four data blocks and the parity block correspond to a stripe. Once all the parity blocks have been created, the data blocks and the corresponding parity blocks are written to disk, in stripes, where each stripe spans the entire five disks and includes four data blocks and one parity block.

In the event that an entire stripe is not written to the disks (i.e., one or more data blocks or the corresponding parity block is not written to disk), then the parity block of the stripe will be inconsistent with the data blocks in the stripe. As a result, the data blocks in the stripe cannot be recovered using the parity block. The aforementioned issue, commonly known as a "write-hole," has been addressed using hardware based solutions.

SUMMARY

In general, in one aspect, the invention relates to a method for writing a logical data block to storage. The method includes receiving a first request to write a logical data block to a storage pool, allocating a number of a first plurality of physical log blocks in a RAID log required to store the logical data block and a parity block for the logical data block, wherein the number of the first plurality of physical log blocks are less than a number of disks storing the RAID log, and writing the logical data block and the parity block to the first plurality of physical log blocks in the RAID log. The method further includes allocating space in a physical slab block in a RAID slab for the logical data block and copying data including the logical data block to the space in the physical slab block. The method additionally includes updating, in the RAID slab, a checksum corresponding to the physical slab block based on the data copied to the physical slab blocks, and updating, in the RAID slab, a parity block corresponding to a data stripe including the physical slab block based on the data copied to the physical slab block.

In general, in one aspect, the invention relates to a plurality of disks. The plurality of disks include a RAID log and a RAID slab. The RAID log includes a plurality of physical log blocks. The RAID log is configured to store, in a number of first physical log blocks of the plurality of physical log blocks, a logical data block and a parity block for the logical data block. The number of first physical log blocks required to store the logical data block and the parity block are less than a number of the plurality of disks storing the RAID log. The RAID slab includes a physical slab block configured to store the logical data block after the logical data block is copied to the RAID log and the physical slab block, a checksum corresponding to the physical slab block, wherein the checksum is updated for the physical slab block after the logical data block is copied to the physical slab block, and a parity block corresponding to a data stripe including the physical slab block, wherein the parity block is updated for the physical slab block after the logical data block is copied to the physical slab block.

In general, in one aspect, the invention relates to a computer readable medium including computer readable program code embodied therein for causing a computer system to perform a method for writing a logical data block to storage. The method includes receiving a first request to write a logical data block to a storage pool, allocating a number of a first plurality of physical log blocks in a RAID log required to store the logical data block and a parity block for the logical data block, wherein the number of the first plurality of physical log blocks are less than a number of disks storing the RAID log, and writing the logical data block and the parity block to the first plurality of physical log blocks in the RAID log. The method further includes allocating space in a physical slab block in a RAID slab for the logical data block and copying data including the logical data block to the space in the physical slab block. The method additionally includes updating, in the RAID slab, a checksum corresponding to the physical slab block based on the data copied to the physical slab blocks, and updating, in the RAID slab, a parity block corresponding to a data stripe including the physical slab block based on the data copied to the physical slab block.

Other aspects of the invention will be apparent from the following description and the appended claims.

DETAILED DESCRIPTION

Figure 1:
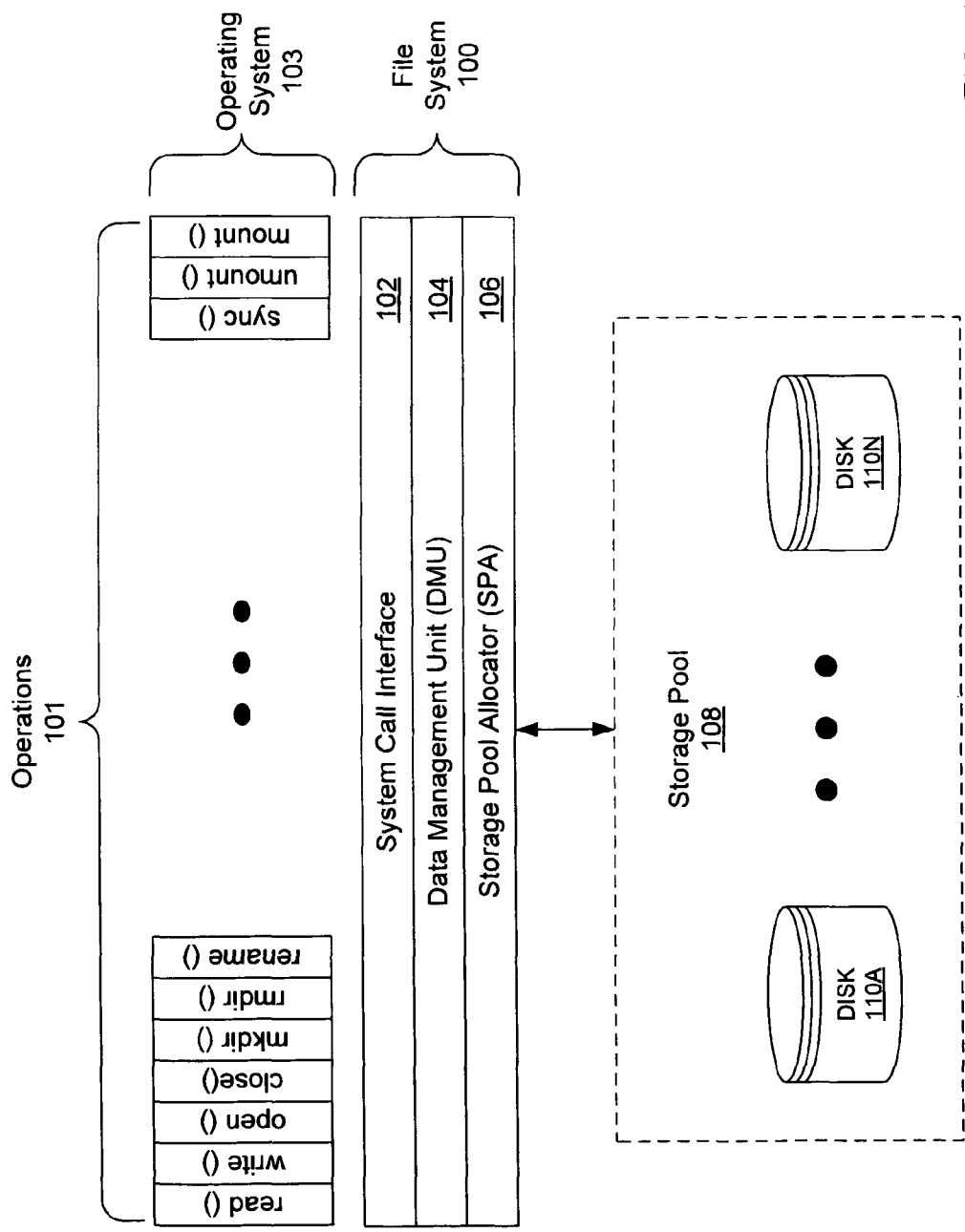
FIGS. 1 and 2 show a system architecture diagram in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for writing data to a storage pool. Specifically, data is first written to a RAID log in the storage pool. After writing the data to the RAID log, the data is copied from the RAID log to a RAID slab. Thus, if failure occurs while writing data to the RAID slab, the data may be recovered from the RAID log. The RAID log and the RAID slab implement different RAID schemes. Specifically, the RAID log implements a RAID scheme that uses a variable size stripe and prevents the write-hole. The RAID slab implements a uniform size stripe and, thereby, allows for faster reading than the RAID log. In the RAID slab, a checksum is calculated and stored for all blocks including the parity block in accordance with one or more embodiments of the invention.

FIG. 1 shows a system architecture in accordance with one or more embodiments of the invention. The system architecture includes an operating system (103) interacting with a file system (100), which in turn interfaces with a storage pool (108). In one or more embodiments of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one or more embodiments of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one or more embodiments of the invention, a request to perform a particular operation (101) (i.e., a transaction) is forwarded from the operating system (103), via the system call interface (102), to the DMU (104). In one or more embodiments of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 4 below. Additionally, in one or more embodiments of the invention, the DMU (104) includes functionality to group related work (i.e., modifications to data blocks and indirect blocks) into I/O requests (referred to as a "transaction group") allowing related blocks to be forwarded to the SPA (106) together. The SPA (106) receives the transaction group from the DMU (104) and subsequently writes the blocks into the storage pool (108). The operation of the SPA (106) is described in FIG. 2 below.

In one or more embodiments of the invention, the storage pool (108) includes one or more physical disks (disks (110A-110N)) and cache memory (discussed below and in FIG. 3A). In one or more embodiments of the invention, the storage capacity of the storage pool (108) may increase and decrease dynamically as physical disks are added and removed from the storage pool. In one or more embodiments of the invention, the storage space available in the storage pool (108) is managed by the SPA (106).

Figure 2:
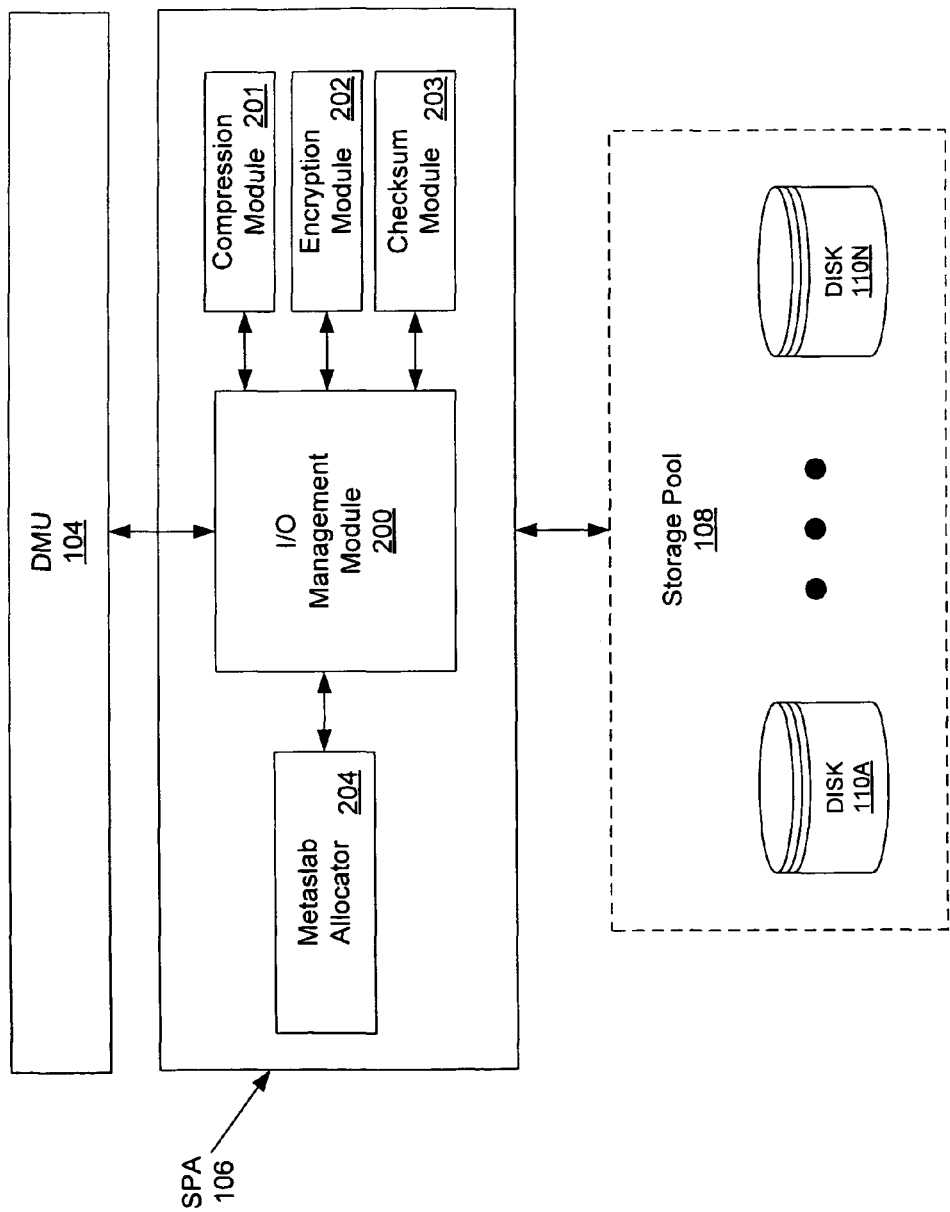

FIG. 2 shows the SPA (106) in accordance with one or more embodiments of the invention. The SPA (106) may include an I/O management module (200), a compression module (201), an encryption module (202), a checksum module (203), and a storage space allocator (204). Each of these aforementioned modules is described in detail below.

As noted above, the SPA (106) receives transactions from the DMU (104). More specifically, the I/O management module (200), within the SPA (106), receives transactions from the DMU (104) and processes the transactions in accordance with one or more embodiments of the invention. The compression module (201) provides functionality to compress larger logical blocks (i.e., data blocks and indirect blocks) into smaller segments, where a segment is the size of a physical log block (described below and in FIGS. 3A-3C). For example, a logical block size of 8K bytes may be compressed to a size of 2K bytes for efficient storage. Further, in one or more embodiments of the invention, the encryption module (202) provides various data encryption algorithms. The data encryption algorithms may be used, for example, to prevent unauthorized access. In one or more embodiments of the invention, the checksum module (203) includes functionality to calculate a checksum for data (i.e., data stored in a logical data block) and metadata (i.e., data stored in a logical indirect block) within the storage pool. The checksum may be used, for example, to ensure data has not been corrupted. The checksum module (203) may be further configured to calculate checksums for the physical blocks (e.g., physical log block and physical indirect block).

As discussed above, the SPA (106) provides an interface to the storage pool and manages allocation of storage space within the storage pool (108). More specifically, in one or more embodiments of the invention, the SPA (106) uses the storage space allocator (204) to manage the allocation of storage space in the storage pool (108).

Figure 3A:
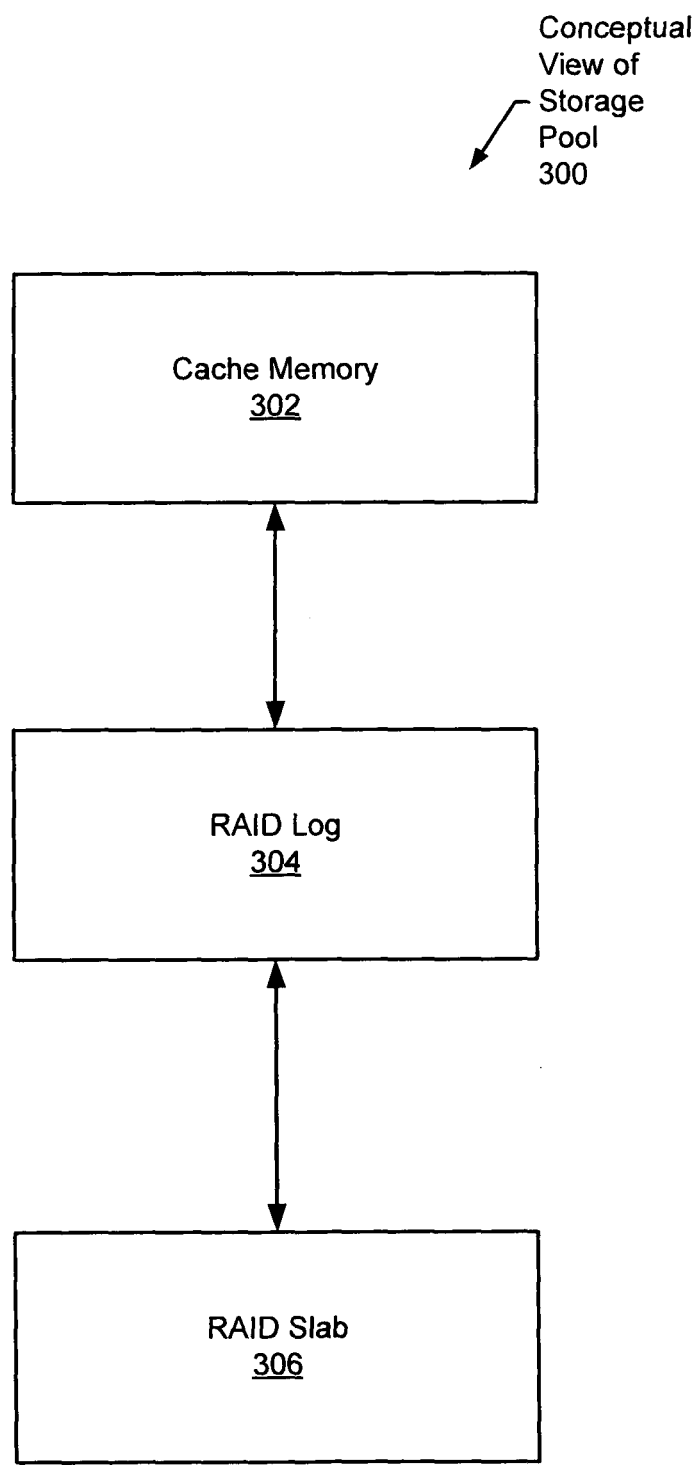
FIGS. 3A-3C show conceptual views of the storage pool in accordance with one or more embodiments of the invention.
Figure 3B:
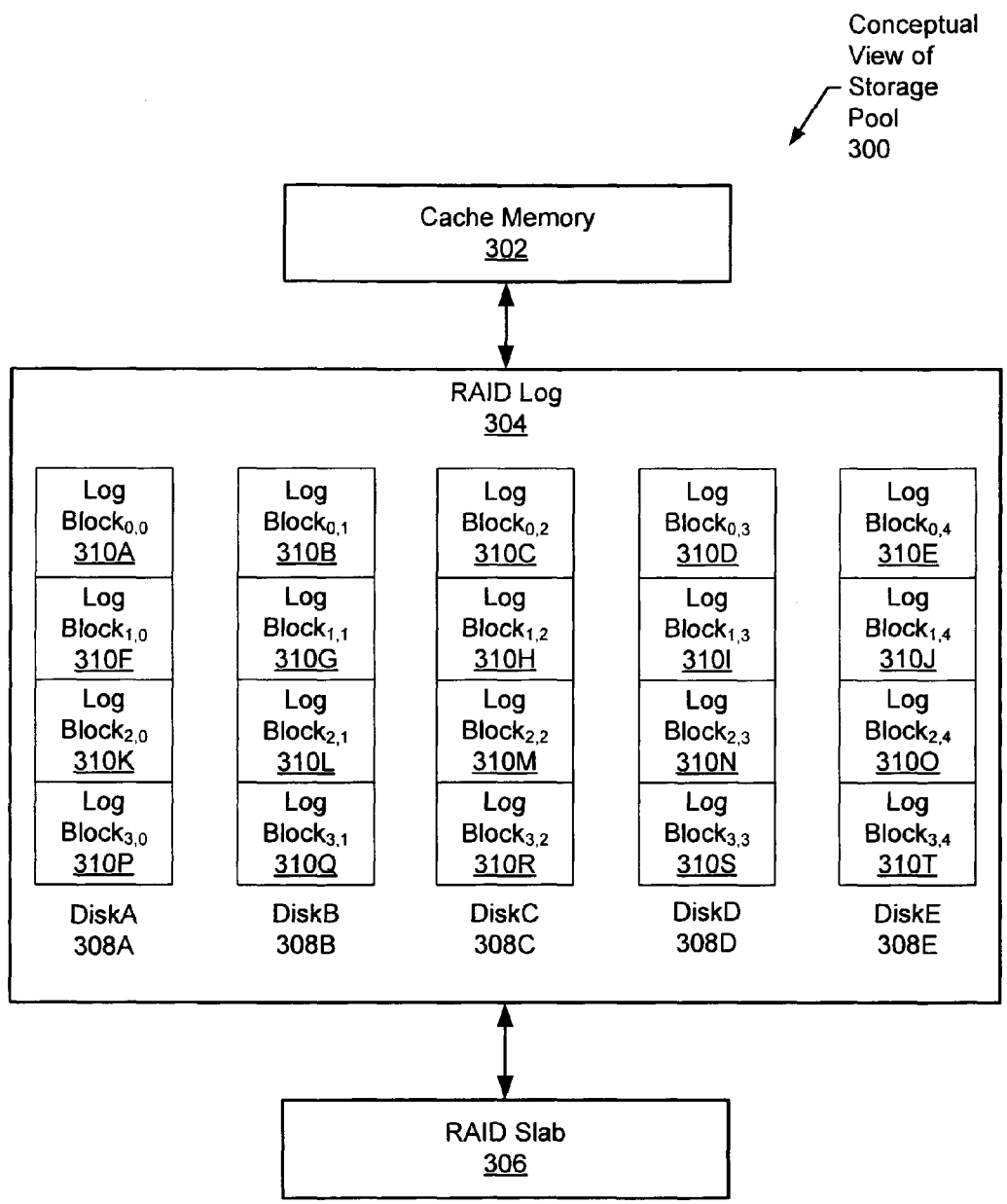
Figure 3C:
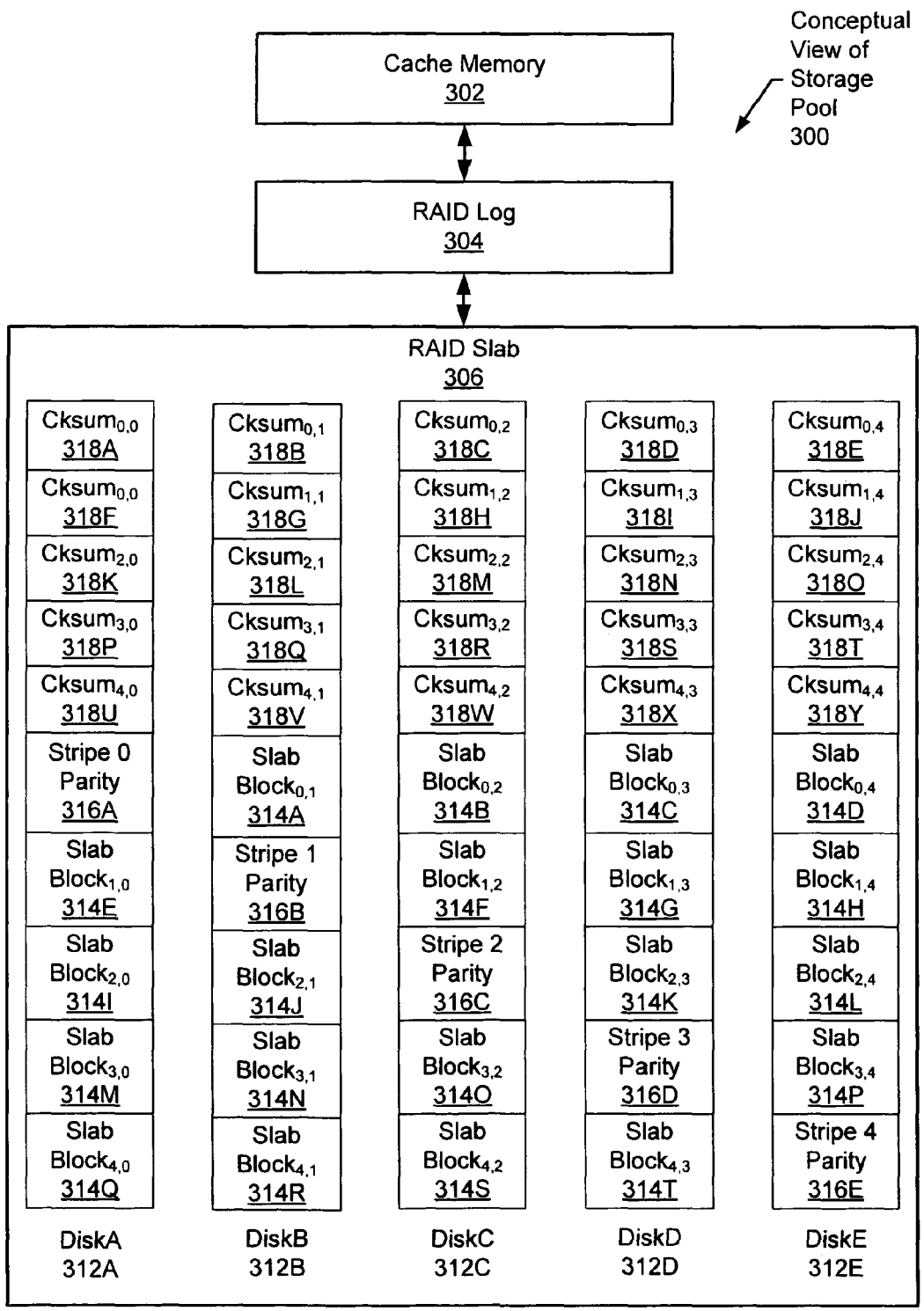

FIGS. 3A-3C show conceptual views of the storage pool in accordance with one or more embodiments of the invention. As shown in FIG. 3A, the storage pool includes cache memory (302), a RAID log (304), and a RAID slab (306). In one or more embodiments of the invention, the cache memory (302) includes all memory that is not on a disk. For example, cache memory may include each processor's cache (e.g., L1 cache, L2 cache) and physical memory. In one or more embodiments of the invention, cache memory includes all memory from which and to which the data is written, directly or indirectly, to/from one or more disks.

FIG. 3B shows a schematic diagram of the RAID log (304) in accordance with one or more embodiments of the invention. In one or more embodiments of the invention, the RAID log (304) provides intermediate storage for logical blocks (discussed below and in FIG. 4). Specifically, data is written to the RAID log (304). From the RAID log (304) the data may be copied to the RAID slab (306). Alternatively, if the data is still in cache after the data is copied to the RAID log (304), the data may be copied from the cache to the RAID slab (306).

As shown in FIG. 3B, the RAID log (304) spans multiple physical disks (308A-E). Although FIG. 3B shows five disks (308A-E), the RAID log (304) may include more or fewer disks without departing from the scope of the invention. Further, as discussed above, the number of disks used by the RAID log (304) may dynamically change as the requirements of the storage pool changes.

In one or more embodiments of the invention, each disk (308A-E) is partitioned into contiguous regions of space, i.e., metaslabs (not shown). The metaslabs assigned to the log are partitioned into physical log blocks (310A-T). Each physical log block (310A-T) may be sized to store only a portion of a logical block (discussed below) in accordance with one or more embodiments of the invention. Thus, a logical block may span multiple physical log blocks (310A-T). Although FIG. 3B shows each disk as having four rows of physical log blocks (310A-T), each disk may have more or rows of physical log blocks without departing from the scope of the invention.

In one or more embodiments of the invention, the RAID log (304) implements a RAID scheme, whereby a stripe in the RAID log includes all of the physical log blocks (310A-T) allocated to a particular logical block (discussed below). Thus, the RAID scheme of the RAID log (304) allows for a variable number of physical log blocks (310A-T) in a stripe. Each stripe includes data blocks (e.g., physical log blocks that include data from the logical block) and one or more parity blocks (e.g., physical log blocks that include parity data).

In one or more embodiments of the invention, the RAID scheme further has a number of parity blocks set according to the size of the stripe. Specifically, if the number of physical log blocks in a stripe is less than the number of disks, then the stripe may include a single parity block. If the number of physical log blocks in the stripe is greater than the number of disks, then the stripe may include multiple parity blocks. The number of parity blocks is equal to the maximum number of rows of physical log blocks on a single disk that is allocated to the logical block. In one or more embodiments of the invention, a row in the RAID log, as used herein, is on a per disk basis. For example, the first row includes the first physical log block on each disk allocated to the logical block. Similarly, the second row includes the second physical log block on each disk allocated to the logical block. Likewise, subsequent rows may be similarly identified. Because a given stripe may not span all disks or even a multiple thereof, the starting address of a stripe may vary depending on the ending physical log block of the previous stripe.

In one or more embodiments of the invention, In this example, the number of rows, r, is calculated using the formula $r=((n-1) \text{ div } d)+1$, where n is the number of physical log blocks required to write the logical block to storage, d is the number of disks in the RAID log, and the div operation outputs only the quotient of the division calculation. For example, if there are five disks in the RAID log and eight physical blocks need to be allocated, then two rows are required.

Further, in one or more embodiments of the invention, if multiple rows of physical log blocks on a single disk are allocated to the logical block, then the rows on the single disk include contiguous data from the logical block. Specifically, the RAID log may be written to by allocating the physical log blocks to the logical block, then writing to all of the physical log blocks allocated to the logical block on a single disk before proceeding to write to the physical log blocks on the next disk. In alternative embodiments, rather than contiguous data in different rows on the same disk, the data may be striped, such that the same row on different disks includes contiguous data.

The following is an example of the RAID scheme using the RAID log (304) shown in FIG. 3B in accordance with one or more embodiments of the invention. In the example, consider the scenario that the logical block requires ten physical log blocks, including two parity blocks. Further, in the example, because physical log $block_{0,0}$ (310A) and physical log $block_{0,1}$ (310B) are used by a previous logical block, the next free physical log block is physical log $block_{0,2}$ (310C). Accordingly, the physical log blocks (310C-L) are allocated to the logical block. The first parity block may be calculated for the first row of physical log blocks allocated to the logical block, and the second parity block may be calculated for the second row of physical log blocks allocated to the logical block. In the example, the first parity block is written to physical log $block_{0,2}$ (310C) and the second parity block is written to physical log $block_{1,2}$ (310H). The first parity block is calculated for data in physical log $block_{0,3}$ (310D), physical log $block_{0,4}$ (310E), physical log $block_{1,0}$ (310F), and physical log $block_{1,1}$ (310G). The second parity block is calculated for data in physical log $block_{1,3}$ (310I), physical log $block_{1,4}$ (310J), physical log $block_{2,0}$ (310K), and physical log $block_{2,1}$ (310L).

Continuing with the example, physical log $block_{0,3}$ (310D) and physical log $block_{1,3}$ (310I) include contiguous data from the logical block. Similarly, physical log $block_{0,4}$ (310E) and physical log $block_{1,4}$ (310J) include contiguous data from the logical block. Physical log $block_{1,0}$ (310F) and physical log $block_{2,0}$ (310K) include contiguous data from the logical block. Finally, physical log $block_{1,1}$ (310G) and physical log $block_{2,1}$ (310L) include contiguous data from the logical block. As discussed above, the above is only an example in accordance with one or more embodiments of the invention and not intended to limit the scope of the invention.

Continuing with the conceptual view of the storage pool (300), the RAID log (304) is operatively connected to a RAID slab (306). FIG. 3C shows a schematic diagram of the RAID slab (306) in accordance with one or more embodiments of the invention. As discussed above, the RAID slab (306) provides storage for logical blocks that are copied from the RAID log (304).

As shown in FIG. 3C, the RAID slab (306) includes multiple physical disks (312A-E). Although FIG. 3C shows five disks (312A-E), the RAID slab (306) may include more or fewer disks without departing from the scope of the invention. Moreover, the disks may be the same or different disks than used by the RAID log (304). Further, as discussed above, the number of disks used by the RAID slab (306) may dynamically change as the requirements of the storage pool changes.

In one or more embodiments of the invention, each disk (310A-E) is partitioned into metaslabs (not shown). The metaslabs assigned to the RAID slab (306) are partitioned into physical blocks. The physical blocks in the RAID slab include physical slab blocks (314A-T), stripe parity blocks (316A-E), and checksum blocks (318A-Y). Each of these blocks is discussed below.

In one or more embodiments of the invention, the physical slab blocks (314A-T) store one or more logical blocks. Specifically, the physical slab blocks (314A-T) may be large enough to store multiple logical blocks. The storage space allocator (discussed above) includes functionality to allocate free space in the physical slab blocks (314A-T) to a logical block according to the amount of free space in the physical slab block (314A-T) and the size of the logical block. Specifically, small amount of free space in a physical slab block are allocated to small logical blocks, while a large amount of free space in a physical slab block are allocated to large logical blocks. The allocation of space in physical slab blocks (314A-T) based on the size of the blocks may allow for more efficient storage of data and metadata in the storage pool by reducing the amount of unused space within a given physical slab block. In one or more embodiments of the invention, the storage space allocator (discussed above) may include a policy that specifies a method to allocate space in a physical slab block.

In one or more embodiments of the invention, the each physical slab block (314A-T) is located in a uniform sized RAID stripe. In other words, all RAID stripes in the RAID slab (306) include the same number of physical blocks in accordance with one or more embodiments of the invention. In one or more embodiments of the invention, the number of physical blocks in a RAID stripe in the RAID slab (306) is equal to the number of disks (312A-E).

Each RAID stripe includes physical slab blocks (314A-T) and at least one parity block (316A-E). The parity block (316A-E) in a RAID stripe provides error correction for the RAID stripe. For example, the data in the Stripe 1 Parity Block (316B) may be an XOR of data in Physical slab block$_{1,0}$ (314E), Physical slab block$_{1,2}$ (314F), Physical slab block$_{1,3}$ (314G), and Physical slab block$_{1,4}$ (314H). Thus, if an error is detected in any of the physical slab blocks (314E-H), then the error may be corrected by performing an XOR operation of the Stripe 1 Parity Block (316B) with the remaining correct physical slab blocks located in Stripe 1.

In one embodiments of the invention, each parity block (316A-E) and each physical slab block (314A-T) is associated with a distinct corresponding checksum block (318A-Y) for the parity block (316A-E) or physical slab block (314A-T). The checksum block (318A-Y) may be used to determine whether an error exists in the corresponding physical block. Specifically, the checksum stored in the checksum block (318A-Y) is calculated using a checksum function from the data in the corresponding physical block. In general, with a high probability, if the data in the corresponding physical block changes, the checksum function returns a different resulting checksum. Thus, an error that changes data in the corresponding physical block may be detected by recalculating the checksum and comparing the recalculated checksum with the previously stored checksum. In one or more embodiments of the invention, any of the different types of checksum functions may be used without departing from the scope of the invention.

For example, Cksum$_{0,1}$ (318B) may correspond only to Physical slab block$_{0,1}$ (314A) and may be used to detect whether an error exists in Physical slab block$_{0,1}$ (314A). Similarly, Cksum$_{3,3}$ (318S) may correspond only to Stripe 3 Parity Block (316D) and may be used to detect whether an error exists in Stripe 3 Parity Block (316D).

Although FIG. 3C shows one layout of physical blocks in the RAID slab (306), other layouts may be used without departing from the scope of the invention. For example, the checksum blocks (318A-Y) may be interspersed with the physical slab blocks (314A-T) and parity blocks (316A-E). Similarly, the ordering and the disk locations of the physical slab blocks (314A-T) and the parity blocks (316A-E) may also be different than shown in FIG. 3C.

Figure 4:
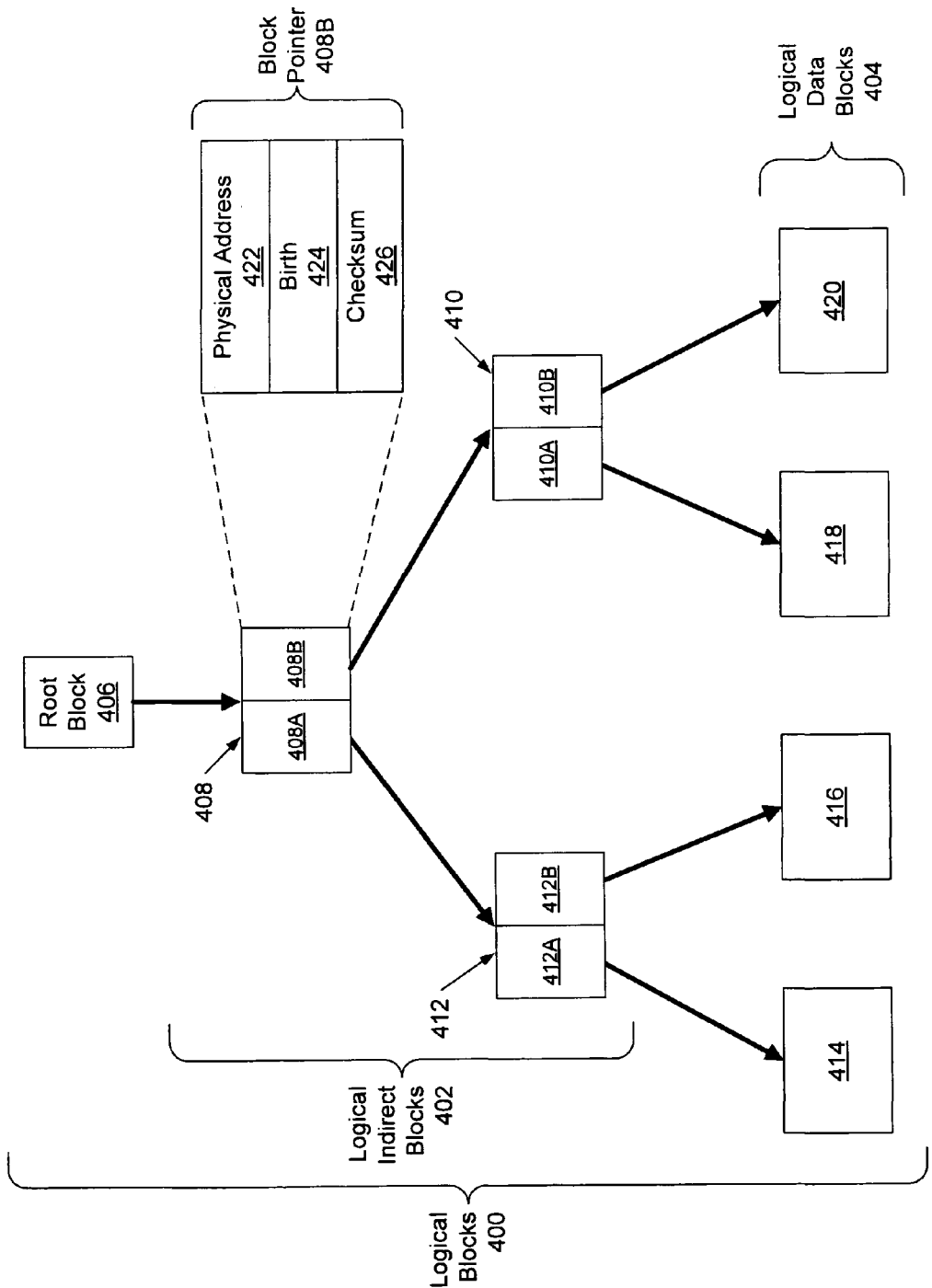
FIG. 4 shows the hierarchical data configuration diagram in accordance with one or more embodiments of the invention.

Continuing with the discussion of the storage of data, as noted above, the physical slab blocks and the physical log blocks store logical blocks. FIG. 4 shows a hierarchical data configuration (hereinafter referred to as a "tree") for storing logical blocks (400). In one or more embodiments of the invention, the tree includes a root block (406), one or more levels of logical indirect blocks (402), and one or more logical data blocks (414). In one or more embodiments of the invention, the location of the root block (406) is in a particular predefined location within the storage pool. Specifically, the physical address of the root block (406) in the storage pool is pre-specified. The root block (406) typically references one or more subsequent logical indirect blocks (408), which may in turn each reference one or more subsequent logical indirect blocks (410, 412).

In one or more embodiments of the invention, the logical indirect blocks (408, 410, and 412) may be arrays of block pointers (e.g., 408A, 408B, etc.) that, directly or indirectly, reference to logical blocks (e.g., logical indirect blocks (410, 412), logical data blocks (404)). The logical data blocks (e.g., 414, 416, 418, and 420) each contains actual data of files stored in the storage pool.

In contrast to the root block (406), logical indirect blocks (402) and logical data blocks (404) may be located anywhere in the storage pool (108 in FIG. 1). In one or more embodiments of the invention, the root block (406) and each block pointer (e.g., 408A, 408B, etc.) includes data as shown in the expanded block pointer (408B). One skilled in the art will appreciate that logical data blocks do not include this information; rather data blocks contain actual data of files within the file system.

In one or more embodiments of the invention, each block pointer may include a physical address (422), a birth time (424) of the logical block referenced by the block pointer, and a checksum (426) of the data stored in the logical block (logical data block or logical indirect block) referenced by the block pointer. In one or more embodiments of the invention, the birth time (424) of the logical block is the time in which the transaction group having the logical block is successively written to the storage pool. In one or more embodiments of the invention, the physical address may be in the form of a metaslab ID and an offset to determine the location of the logical block in the storage pool. For example, the metaslab ID may identify a particular metaslab. More specifically, the metaslab ID may identify the particular disk (within the storage pool) upon which the metaslab resides and where in the disk the metaslab begins. The offset may then be used to reference a particular location in the metaslab. Other addressing schemes may be used without departing from the scope of the invention. For example, rather than or in addition to including a metaslab ID, the physical address may include a physical block identifier and an offset for the physical block.

In one or more embodiments of the invention, the data referenced by the particular physical address may correspond to either a logical data block or a logical indirect block. If the data corresponds to a logical indirect block, then the physical address within a block pointer in the logical indirect block are extracted and used to locate a subsequent logical data block or logical indirect block. The tree may be traversed in this manner to eventually retrieve a requested logical data block.

In one or more embodiments of the invention, the physical address only references locations in the RAID slab. In such embodiments, the location referenced by physical address in the RAID slab may be associated with a subsequent reference to a location in the RAID log when the logical block allocated to the location specified by the physical address in the RAID slab is not yet copied to the RAID slab. For example, consider the scenario in which logical data block (418) is located in the RAID slab and logical data block (420) is stored in the RAID log. In embodiments in which the physical address only references locations in the RAID slab, the physical address in block pointer (410A) may reference the location of logical data block (418) in the RAID slab and the physical address in block pointer (410B) may reference the location only allocated to the logical data block (420) in the RAID slab. The location allocated to the logical data block (420) in the RAID slab may be associated with an additional physical address of the location of the logical data block (420) in the RAID log.

Alternatively, the physical address may directly reference the RAID slab or the RAID log depending on the location of the logical block. In such a scenario, as will be discussed below, when the logical block is moved, the physical address in the block pointer referencing the logical block is updated.

In one or more embodiments of the invention, copy-on-write transactions are performed for every data write request to a file. Specifically, all write requests cause new available locations to be allocated for the modified data. Therefore, the retrieved logical data blocks and logical indirect blocks are never overwritten (until a modified version of the logical data block and logical indirect block is committed) in accordance with one or more embodiments of the invention. In one or more embodiments of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

As an exception to every transaction being a copy-on-write transaction, modifying a physical address of a block pointer to reference the location of a logical block that is copied from the RAID log to the RAID slab may be performed directly on the existing logical indirect block having the block pointer in accordance with one or more embodiments of the invention. Alternatively, modifying a physical address of a block pointer to reference the location of a logical block that is copied from the RAID log to the RAID slab may require a creation of a new logical indirect block in accordance with one or more embodiments of the invention.

Although FIG. 4 shows a layout where each logical indirect block (402) references at most only two subsequent logical blocks (logical indirect blocks or data blocks), each logical indirect block may include references to more than two subsequent logical blocks without departing from the scope of the invention. Further, although FIG. 4 only shows four levels in the tree (i.e., the height of the tree is four in FIG. 4), more or fewer levels may be added/removed without departing from the scope of the invention. Further, the path length from the root block (406) to the logical data block (404) may be heterogeneous amongst the logical data blocks without departing from the scope of the invention.

Although FIG. 4 shows a hierarchical data configuration for storing logical blocks, in one or more embodiments of the invention, the hierarchical data configuration is not used. For example, other file storage systems may be used that do not use the logical indirect blocks. In such embodiments, the logical data block may be any logical grouping of data that is to be written to the storage pool.

FIGS. 5-8B show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps discussed below with reference to FIGS. 5-8 may be performed, for example, by the SPA, the DMU and the SPA, and/or other components executing on a computer processor (discussed below and in FIG. 10).

Figure 5:
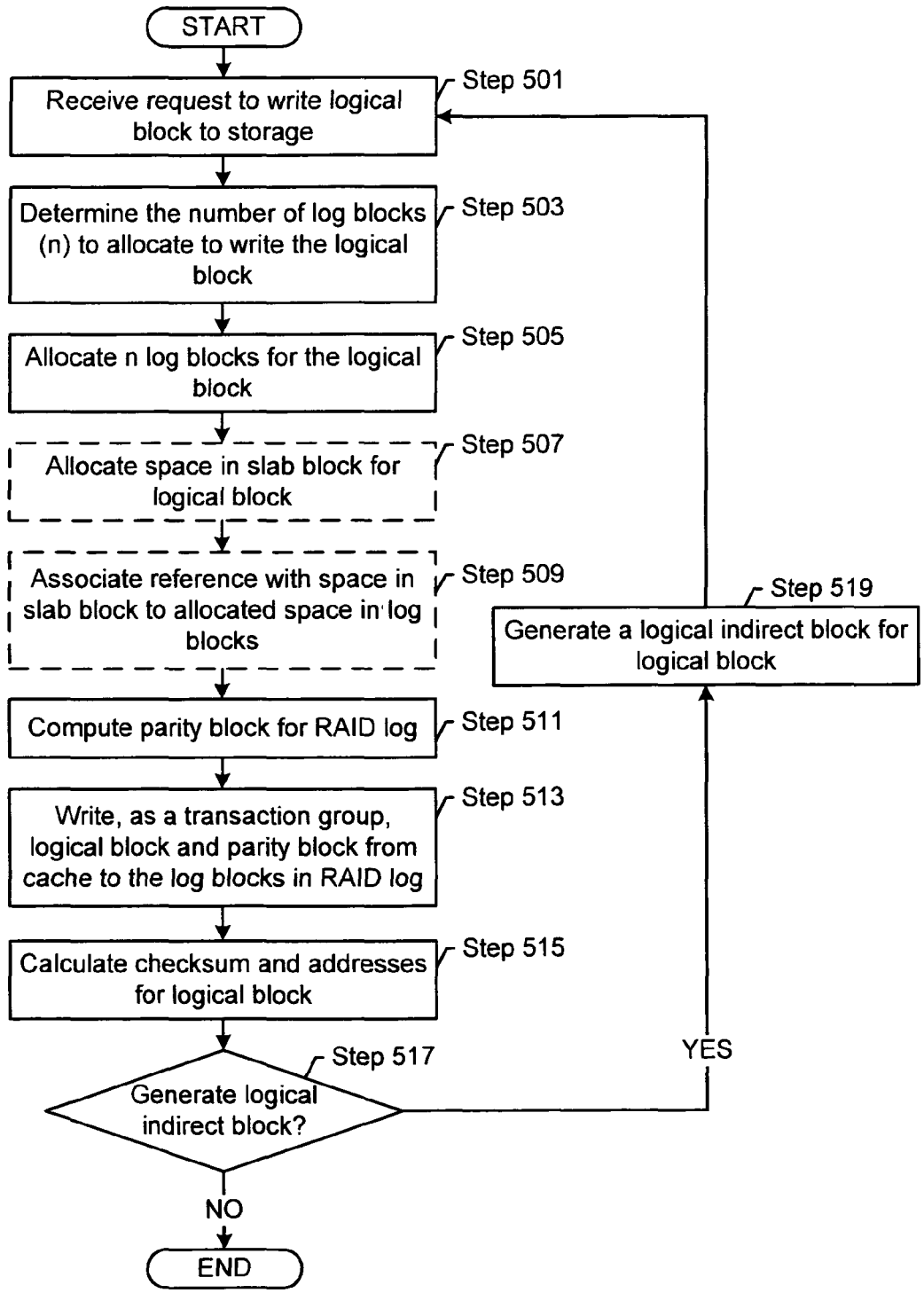
FIGS. 5-8B show flowcharts in accordance with one or more embodiments of the invention.

FIG. 5 shows a flowchart for writing a logical block to the RAID log in accordance with one or more embodiments of the invention. In Step 501, a request to write the logical block to storage is received. If the logical block is a logical data block, then the request may be triggered by the DMU receiving a write request with data from the operating system. The DMU translates the request to logical data blocks and sends the request to the SPA. Accordingly, the SPA receives a request from the DMU to write a logical block to memory.

In Step 503, the number of physical log blocks (n) to allocate to write the logical block is determined. Subsequently, the number of blocks needed to write the logical data to disk is computed using the size of the logical block and the replication type. For example, the replication type may be defined specifically for the logical block, the file that the logical block is associated, by default, etc. In one embodiment of the invention, the size of logical block corresponds to the number of physical log blocks required to write the logical block to disk. For example, if a logical block is 1K of data, the single logical block may be stored in two physical log blocks on disk assuming that each individual physical log block is 512 bytes.

The following are examples of determining the number of physical log blocks to allocate to write the logical block. For example, if the logical block is to be written to disk using a RAID scheme, then the number of physical log blocks to allocate is determined by summing the number of physical log blocks required to write the logical block and an appropriate number of parity blocks (i.e., physical blocks used to store parity data associated with one or more of the physical blocks).

Different RAID schemes may be used. For example, a modified RAID scheme may be used in accordance with one embodiment of the invention. In the modified RAID scheme, the number of parity blocks that are needed is computed as a function of the number of disks in the RAID log and the number of physical log blocks that are necessary to allocate for the logical block corresponding to the data that is to be written to the storage pool. More specifically, the number of disks in the storage pool across which data is striped determines how often to insert parity blocks when writing data.

As an example of the modified RAID scheme, if five disks are used in the RAID log across which data is striped, then a parity block is computed at least once for every four data blocks written to disk. Thus, if the total physical size of the data is, e.g., 3K (i.e., six physical log blocks of data), then two parity blocks are also written to disk along with the data. The total number of physical blocks is the total number of physical log blocks used for the data in the logical block and the number of parity blocks. Using the above example, for a 3K logical block, eight physical blocks are allocated on disk to store the data using the modified RAID scheme (i.e., six data blocks and two parity blocks).

At this stage, the number of physical log blocks that need to be allocated has been determined, however, the number of physical log blocks that need to be allocated may need to be increased to prevent (or mitigate) fragmentation in file system. To determine if the number of physical log blocks that need to be allocated is sufficient, a determination is made whether the number of blocks computed is odd. If the number of blocks computed is odd, then the number of physical log blocks to allocate is rounded up to the next even number. In one embodiment of the invention, the number of physical log blocks allocated is rounded up to an even number to prevent fragmentation. That is, because most replication types require at least two physical log blocks, fragmentation of data (i.e., where contiguous physical blocks of data are not allocated for logical blocks) is prevented by restricting the allocation size to even numbers.

In Step 505, the number of physical log blocks are allocated for the logical block in accordance with one or more embodiments of the invention. Specifically, n number of free physical log blocks are identified and reserved for the logical block.

In Step 507, in addition to the physical log blocks, space in the physical slab block may be allocated to the logical block. In one or more embodiments of the invention, space is allocated in the physical slab block according to the size of the logical block. In one or more embodiments of the invention, when allocating space in the physical slab block, only the size of the logical block is considered. Specifically, because the physical slab block is located in a separate stripe that includes a parity block, the space required to store the parity blocks in the RAID log are ignored. Moreover, as discussed above, allocating the space may be based on the size of free space in the physical slab blocks. Specifically, space in physical slab blocks having smaller amounts of free space may be allocated to smaller logical blocks in order to reserve the larger amounts of contiguous free space to larger logical blocks. Other priority semantics that account for load balancing, power considerations, etc. may be used when allocating space in the RAID slab.

Continuing with FIG. 5, in Step 509, a reference to the allocated space in the physical log blocks is associated with the space in the physical slab block. In one or more embodiments of the invention, the reference may be stored in pre-defined location associated with the physical slab block. A flag associated with the location in the physical slab block may indicate that the data in the physical slab block is invalid and that the reference should be used to obtain the data from the physical log blocks.

In one or more embodiments of the invention, Steps 507 and 509 are performed in embodiments using the hierarchical data configuration (discussed above and in FIG. 4). Specifically, Steps 507 and 509 may be used in embodiments in which a referencing logical indirect block (i.e., logical indirect block referencing the logical block being stored) includes a reference to the physical slab block regardless of when the logical block being stored is copied to the physical slab block. Thus, the referencing logical indirect block may include the reference to the allocated space in the physical slab block prior logical block being stored in the allocated space of the physical slab block. Alternatively, space may be allocated to the physical slab block in at a later step.

In Step 511, a parity block is computed for the RAID log. Different methods for computing the parity block may be performed without departing from the scope of the invention. For example, the data to be stored in the physical log blocks corresponding to the may be XOR'd to compute the parity block.

Continuing with FIG. 5, in Step 513, the logical block and parity block is written as a transaction group from the cache to the allocated n physical log blocks in the RAID log. In one or more embodiments of the invention, the entire stripe for the logical block and the parity block is written at once. Said another way, if one of the multiple disks fails during the full write operation to the RAID log, then none of the data blocks or the parity block is written to disk. If failure occurs during the write operation, then the logical block may be re-obtained from cache. After writing the data to the RAID log, the corresponding page in the cache is freed.

In Step 515, checksums and addresses are calculated for the logical block in accordance with one or more embodiments of the invention. In one or more embodiments of the invention, the checksums and the addresses are calculated for the block pointer referencing the logical block being stored. Accordingly, in one or more embodiments of the invention, the calculated checksum is calculated using only and all data in the logical block. Because the parity blocks are excluded when copying the data from the physical log blocks to the physical slab block, the parity blocks may be excluded when calculating the checksum for the logical block in accordance with one or more embodiments of the invention. The calculated address may be the address of the physical slab block or the address of the physical log blocks in accordance with one or more embodiments of the invention. For example, if the physical slab block is pre-allocated in Step 507, then the address may be the address of the physical slab block. However, if the physical slab block is not pre-allocated, then the address may be the address of the physical log block.

In Step 517, a determination is made whether to generate a logical indirect block in accordance with one or more embodiments of the invention. In one or more embodiments of the invention, a logical indirect block is generated when the logical block being stored is not a direct child of the root block.

In one or more embodiments of the invention, if a determination is made to generate a logical indirect block, in Step 519, the logical indirect block is generated for the logical block being stored in accordance with one or more embodiments of the invention. Specifically, the checksum and the address may be sent to the DMU to calculate the logical indirect block. Thus, the method may repeat starting with Step 501 for the next logical indirect block.

Alternatively, a determination may be made not to write a logical indirect block. For example, the logical block being stored in the RAID log may be a direct child logical block of the root block. In such a scenario, the root block may be updated to reference the child logical block. Updating the root block may include updating a physical address in the root block to reference the address calculated in Step 517.

In one or more embodiments of the invention, Steps 515, 517, and 519 are performed based on whether the hierarchical data configuration in FIG. 4 is used. For example, if another file storage system is used, one or more of Steps 515, 517, and 519 may be omitted. In such embodiments, other techniques may be performed to track the storage of data in the storage pool.

Figure 6:
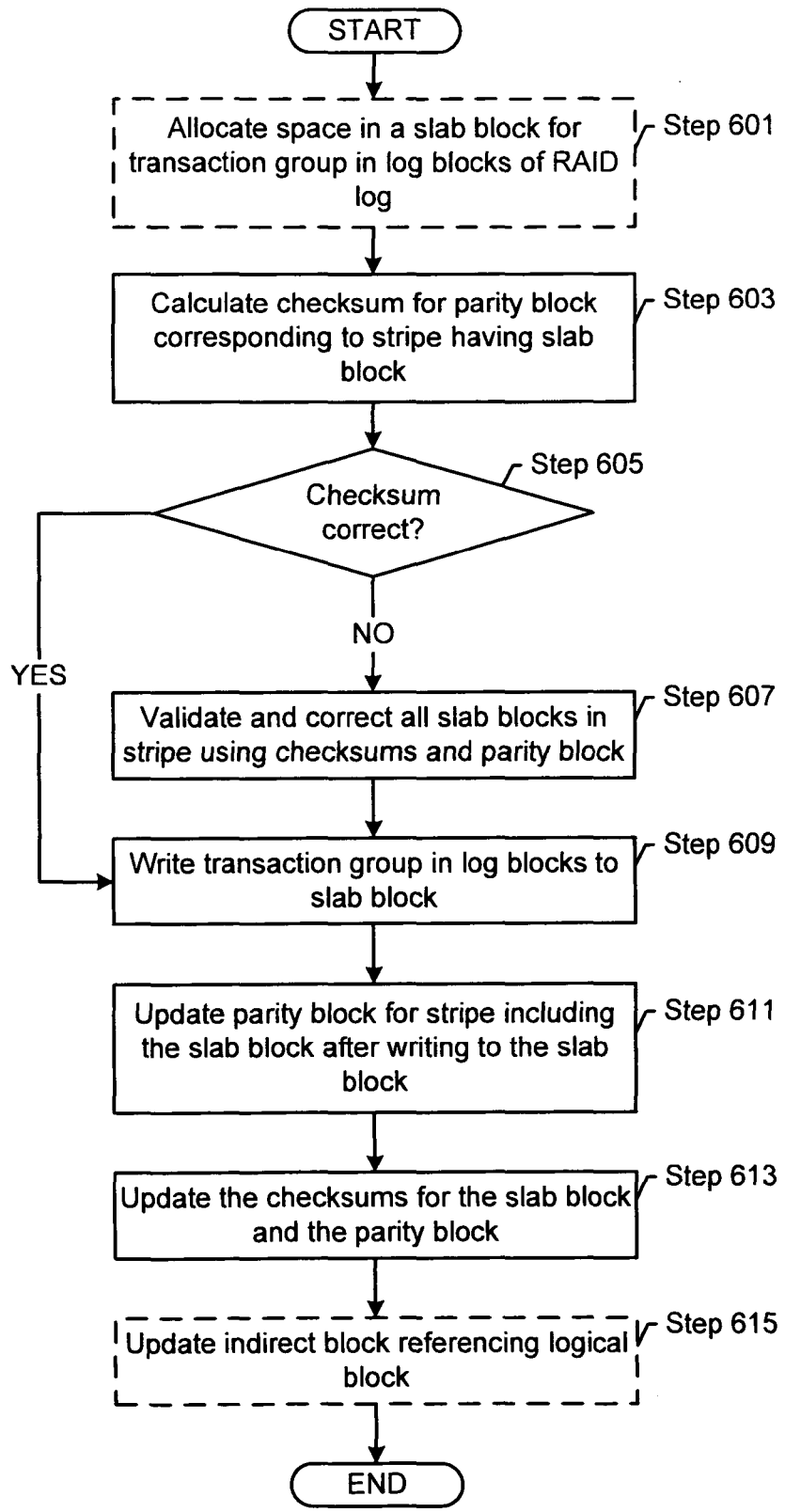

While or after writing logical blocks to the RAID log, the logical blocks from the RAID log may be copied from the RAID log to the RAID slab. FIG. 6 shows a flowchart for copying the logical block from the RAID log to the RAID slab in accordance with one or more embodiments of the invention. In one or more embodiments of the invention, multiple logical blocks are copied as a single group to a physical slab block.

In Step 601, space is allocated in a physical slab block in accordance with one or more embodiments of the invention. In one or more embodiments of the invention, the space is allocated in the physical slab block when the space was not previously allocated in a physical slab block in Step 507 of FIG. 5. Allocating space in the physical slab block may be performed as discussed above with reference to Step 507 of FIG. 5.

In Step 603, the checksum for the parity block corresponding to the stripe that includes the physical slab block is calculated. Specifically, the stripe is identified that includes the slab having the allocated space. The parity block for the stripe is identified. Data from the parity block is used to calculate a new checksum for the parity block. Calculating the checksum is performed using the same checksum function as used to calculate the stored checksum corresponding to the parity block.

In Step 605, a determination is made whether the calculated checksum is correct. If the calculated checksum is correct, then the parity block is correct. If the calculated checksum is not correct, then the physical slab blocks in the stripe are validated and corrected using the corresponding checksums and parity block. Specifically, a checksum is calculated for each of the physical slab blocks in the stripe. Each of the calculated checksums is compared with the corresponding stored checksum to determine which, if any, have an error. If the checksums match, then the physical slab blocks are error free. Accordingly, the physical slab blocks may be used to calculate a new parity block for the stripe. The new parity block is stored.

In Step 609, the transaction group in the physical log blocks is written to the physical slab block. Specifically, the physical log blocks to be copied to the physical slab block are copied to the physical slab block as a single transaction group. As discussed above, the physical log blocks may include multiple logical blocks. Alternatively, in one or more embodiments of the invention, if the data for the logical data block is still in the cache at this stage, the data may be copied to the physical slab block directly from the cache.

Continuing with FIG. 6, in Step 611, the parity block is updated for the stripe including the physical slab block after writing to the physical slab block. Specifically, the parity block in the stripe is updated to reflect the new data in the physical slab block.

In Step 613, the checksums for the physical slab block and the parity block are updated. Specifically, new checksums are calculated for the physical slab block and for the parity block and stored in the respective locations.

Although not shown in FIG. 6, if the parity block is being used for the first time, then the unused disk space and corresponding checksums in the stripe may be set to zero. A parity block may be calculated after the storage of the data and the checksums is updated to reflect the new parity block.

In Step 615, the referencing logical indirect block referencing the logical block may be updated in accordance with one or more embodiments of the invention. In one or more embodiments of the invention, updating the referencing logical indirect block is performed based on implementation. Specifically, the referencing logical indirect block is updated when the referencing logical indirect block does not already reference the allocated space in the physical slab block. (discussed above with reference to Step 509 in FIG. 5).

Different techniques may be used to update the referencing logical indirect blocks. In each technique, the new physical address corresponding to the location in the physical slab block is identified. In a first technique, if the RAID slab does not require strict copy on write, then updating the referencing logical indirect block includes identifying the referencing logical indirect block and overwriting an existing physical address in the block pointer of the referencing logical indirect block. The referencing logical indirect block may be identified by traversing the tree. Specifically, each subsequent logical block starting with the root may be accessed to determine whether the logical block references is the referencing logical indirect block to the block being stored in the RAID slab. As another method for identifying the referencing logical indirect block, the referencing logical indirect block may be identified by using a back reference, stored with the logical indirect block, to the referencing logical indirect block, if such back reference exists.

As another technique to update the referencing logical indirect blocks, consider the scenario in which the RAID slab maintains a pure copy write requirement. In such a scenario, updating the referencing logical indirect block may include writing a new referencing logical indirect block that includes the new physical address of the location in the physical slab block. If a new referencing logical indirect block is written, then the tree may be traversed to re-create each previous referencing logical indirect block. Specifically, when a new referencing logical indirect block is created, if it is not stored in the same location as the old version of the referencing logical indirect block, then the previous logical indirect block that references the referencing logical indirect block would also need to be re-created. Thus, in such technique, each logical block in the path from the root logical block to the logical block being stored in FIG. 6 is recreated.

The above techniques are only a few techniques for updating the physical address of the referencing logical indirect block to reference the logical block being stored. Other techniques may be used without departing from the scope of the invention. Further, the above techniques and Step 615 are performed in embodiments using the hierarchical data configuration (discussed above and in FIG. 4). Specifically, Step 615 and the above techniques may be omitted in embodiments in which the hierarchical data configuration is not used.

When the hierarchical data configuration is used, another technique for writing logical blocks to memory is to perform a level by level writing to the storage pool. Specifically, in the level by level writing, all logical blocks in the same level (i.e., logical blocks that are the same distance from the root node) starting with the lowest level are written as a group to the RAID log and subsequently the RAID slab prior to writing the immediately preceding level to the storage pool. The following is an example of the aforementioned technique.

First, each logical data block is written to the RAID log and then to the RAID slab as discussed above. In other words, the lowest level of the hierarchical data configuration shown in FIG. 4 is written to the RAID log and the RAID slab. After all logical data blocks (i.e., the lowest level of the hierarchical data configuration) are written to the RAID slab, the storage information of the logical data blocks in the RAID slab is used to generate logical indirect blocks that directly reference the logical data blocks. Second, each logical indirect block that directly references the logical data block is then written to the RAID log and then to the RAID slab. In other words, the second to lowest level of the hierarchical data configuration shown in FIG. 4 is written to the RAID log and the RAID slab. After all logical indirect blocks directly referencing logical data blocks (i.e., the second to lowest level of the hierarchical data configuration) are written to the RAID slab, the storage information of the logical indirect blocks in the RAID slab is used to generate the next level of logical indirect blocks that directly reference the second level of logical indirect blocks. Thus, the method may repeat to generate and store subsequent levels of logical blocks until the root block is updated in the storage pool.

Figure 7A:
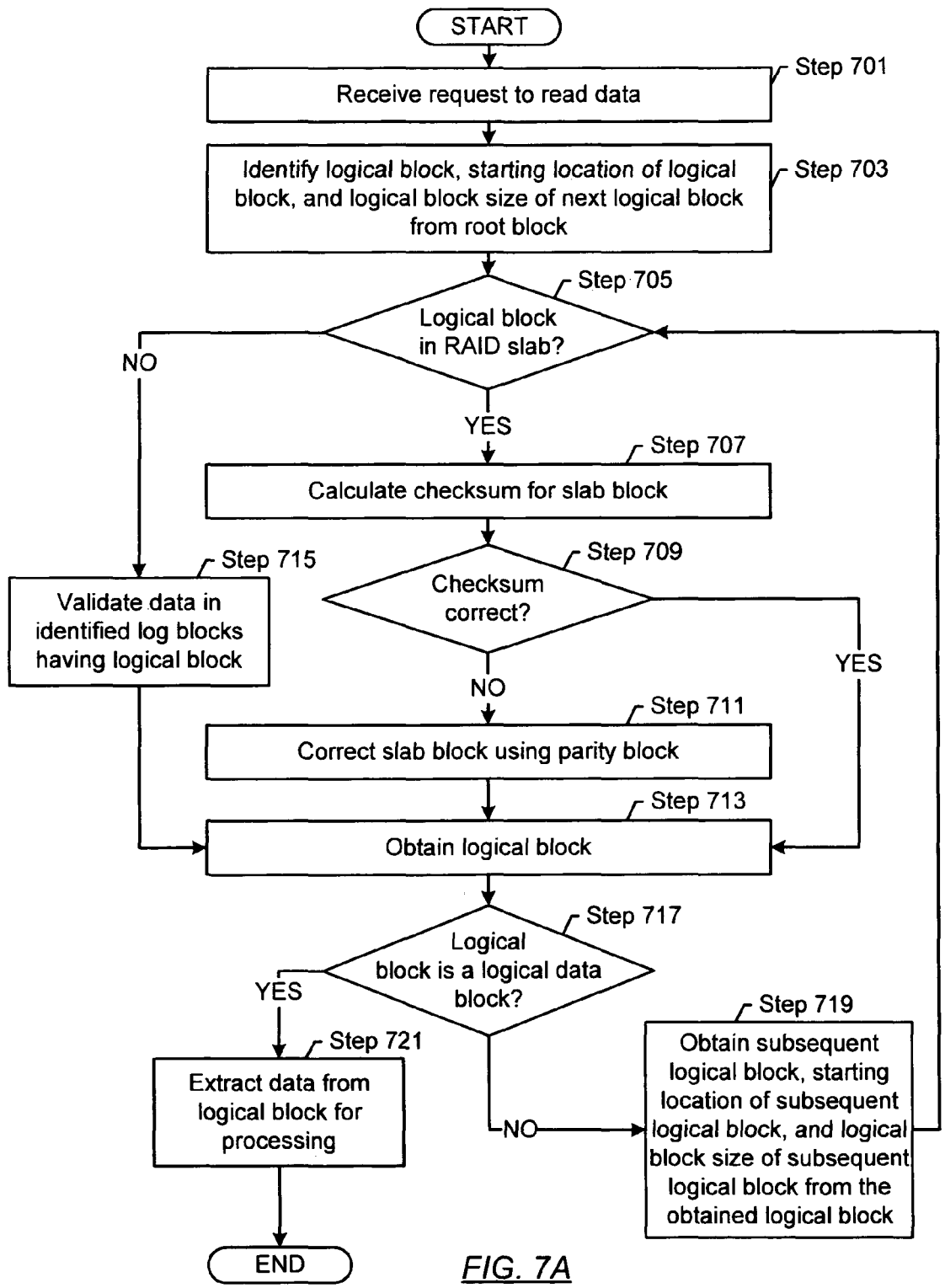

FIG. 7A shows a flowchart for reading a logical block from the storage pool when a hierarchical data configuration is used in accordance with one or more embodiments of the invention. In Step 701, a request to read data is received. For example, the operating system may issue a request to the DMU to read data. The DMU may request the corresponding logical data block from the SPA.

In Step 703, the logical block, starting location of the logical block, and logical block size of the next logical block from the root block is identified. That is, the block pointer of the root block is obtained and read to determine the physical address and size and replication type of the logical block referenced by the root block. The logical block size stored in the block pointer of a block indicates the actual size of the data corresponding to the next block. In other words, because the logical block size of data may be different than the size of the physical log blocks or the size of the physical slab blocks allocated to store the data, the logical block size is used to determine where the data stops on disk (e.g., how many physical log blocks actually need to be retrieved beginning with the starting location of the block or how much data to obtain from the physical slab block).

In Step 705, a determination is made whether the logical block is in the RAID slab. Specifically, a determination is made whether the physical address references the RAID slab or the RAID log. If the physical address references the RAID slab, then a determination may be made whether the location specified by the physical address includes a reference to the RAID log. In such a scenario, the physical address is determined to indirectly reference the RAID log and the reference obtained from the location in the RAID slab is used. Obtaining the logical block from the RAID log is discussed below with reference to Step 715.

Continuing with FIG. 7A, in Step 707, if the logical block is in the physical slab block, then a checksum of the physical slab block is calculated in one or more embodiments of the invention. Specifically, the physical slab block referenced by the location is identified. All data located in the physical slab block is used to calculate a new checksum for the physical slab block. Calculating the checksum is performed using the same checksum function as used to calculate the stored checksum corresponding to the physical slab block. Rather, then calculating the checksum for the slab block as shown in FIG. 7A, the data in the logical block may be verified using a checksum calculated for the logical block. Specifically, the checksum in the logical indirect block referencing the logical block may be used to verify the logical block (as discussed above and in FIG. 4).

In Step 709, a determination is made whether the calculated checksum is correct. If the calculated checksum is correct, then, with a high probability, the data in the physical slab block is error free. If the calculated checksum is not correct, then the checksums of the remaining physical slab blocks and parity block in the stripe is calculated and checked to determine if the checksums are correct. In Step 711, if the checksums are correct, then the physical slab block having the logical block is corrected using the panty block and the remaining physical slab blocks in the stripe. For example, in one or more embodiments of the invention, the parity block and the remaining physical slab blocks may be XOR'd with each other to obtain the data for the physical slab block having the logical block.

If the checksum of the physical slab block is determined correct in Step 709 or after the physical slab block is corrected in Step 711, the logical block is obtained from the RAID slab in Step 713. Specifically, the physical address and the size are used to obtain the logical block from the physical slab block.

Returning to Step 705, if the logical block is not in the RAID slab, then the data in the identified physical log blocks having the logical block are validated in Step 715. In one or more embodiments of the invention, the logical block size and the replication type are determined. The replication type may be limited to a RAID scheme in one or more embodiments of the invention. For example, the replication type may be stored in the referencing logical indirect block or the root block or set by default. The logical block size and the replication type are used to identify which physical log blocks are used to store the logical block and the layout of the logical block and parity blocks in the RAID log. Validating the data may include correcting detected errors in the physical log blocks. Further, in Step 713, the logical block is obtained from the physical log blocks. Specifically, the data from the identified physical log blocks are retrieved.

In Step 717, a determination is made whether the logical block is a logical data block. If the logical block is not a logical data block, then the logical block obtained in Step 713 is a logical indirect block. In Step 719, the subsequent logical block, starting location of the subsequent logical block, and the logical block size of the subsequent logical block is obtained from the logical indirect block obtained in Step 713. Obtaining the subsequent logical block information may be performed in a similar manner to obtaining the information discussed above with reference to Step 701.

Returning to Step 717, if the logical block is a logical data block, then in Step 721, the data is extracted from the logical block for processing in accordance with one or more embodiments of the invention.

Figure 7B:
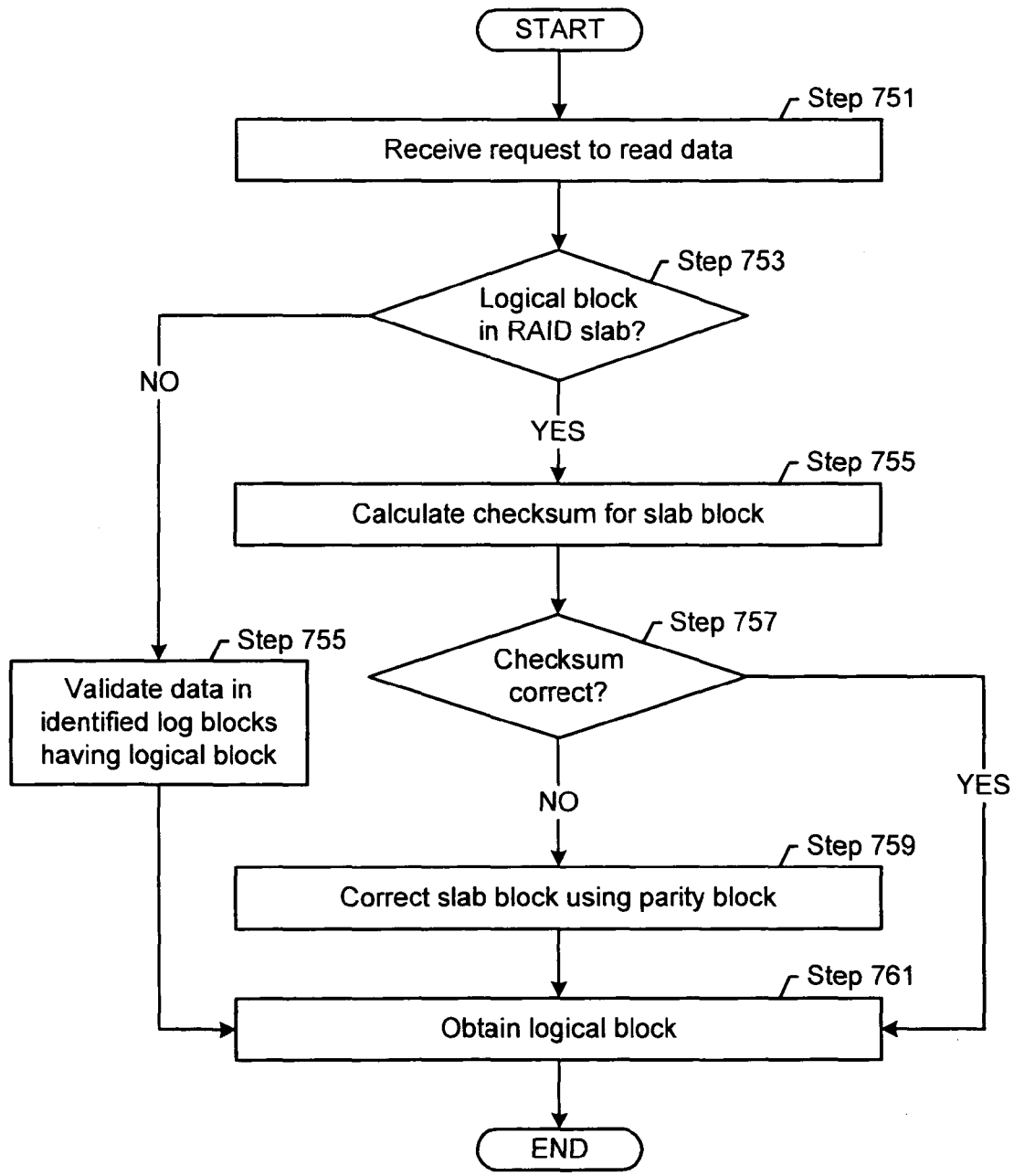

FIG. 7B shows a flowchart for obtaining data from the storage pool when the hierarchical data configuration is not used in accordance with one or more embodiments of the invention. In Step 751, a request to read data is received. For example, the operating system may issue a request to the DMU to read data. The DMU may identify the physical address of the logical data block that includes the requested data.

In Step 753, a determination is made whether the logical data block is in the RAID slab. Specifically, a determination is made about whether the physical address references the RAID slab or the RAID log. If the physical address references the RAID slab, then a determination may be made about whether the location specified by the physical address includes a reference to the RAID log. In such a scenario, the physical address is determined to indirectly reference the RAID log and the reference obtained from the location in the RAID slab is used.

If the logical data block is in the RAID slab, then in Step 755 a checksum of the physical slab block is calculated in one or more embodiments of the invention. Specifically, the physical slab block referenced by the location is identified. All data located in the physical slab block is used to calculate a new checksum for the physical slab block.

In Step 757, a determination is made whether the calculated checksum is correct. If the calculated checksum is correct, then, with a high probability, the data in the physical slab block is error free. If the calculated checksum is not correct, then the checksums of the remaining physical slab blocks and parity block in the stripe is calculated and checked to determine if the checksums are correct.

In Step 759, if the checksum is correct, then the physical slab block having the logical data block is corrected using the parity block and the remaining physical slab blocks in the stripe. For example, in one or more embodiments of the invention, the parity block and the remaining physical slab blocks may be XOR'd with each other to obtain the data for the physical slab block having the logical block.

If the checksum of the physical slab block is determined correct or after the physical slab block is corrected, the logical data block is obtained from the RAID slab and the data is used in Step 761.

Returning to Step 753, if the logical data block is not in the RAID slab, then the data in the identified physical log blocks having the logical block is validated in Step 755. In one or more embodiments of the invention, the logical data block size is determined and used to identify which physical log blocks are used to store the logical data block and corresponding parity blocks. Validating the data may include correcting detected errors in the physical log blocks. In Step 761, the logical data block is obtained from the physical log blocks. Specifically, the data from the identified physical log blocks are retrieved.

Figure 8A:
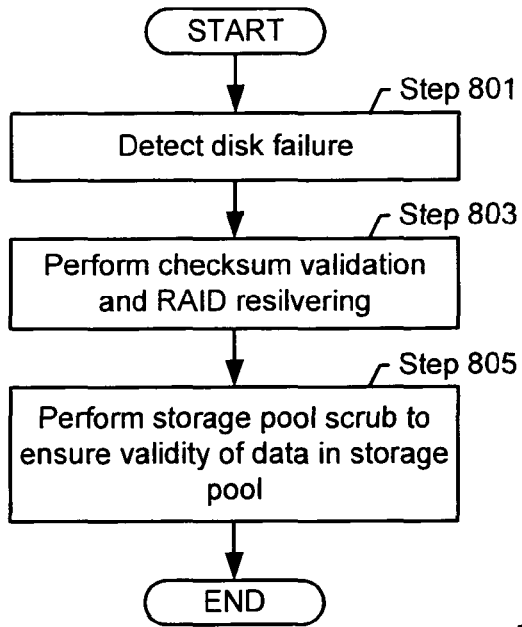

FIG. 8A shows a flowchart for recovering from failure in accordance with one or more embodiments of the invention. FIG. 8A shows a flowchart for recovering from failure when one of the disks crashes in one or more embodiments of the invention. In Step 801, disk failure is detected.

In Step 803, based, on the detection, checksum validation and RAID resilvering may be performed. Checksum validation includes calculating checksums for each of the physical slab blocks and parity blocks. The calculated checksums are compared with the stored checksums. For any of the checksums that do not match, the corresponding physical slab blocks and parity blocks are corrected.

One method of correcting the blocks is to use the RAID resilvering approach whereby the correct data block is calculated using the other valid data blocks and parity blocks in the same stripe. If enough such valid data blocks and parity blocks do not exist, then the data is marked as faulty.

Continuing with FIG. 8A, in Step 805, a pool scrub may be performed to ensure the validity of data of the storage pool. Specifically, as a background process, the RAID log and the RAID slab may be checked to determine whether any additional errors exist. If errors exist, then the errors are corrected.

Figure 8B:
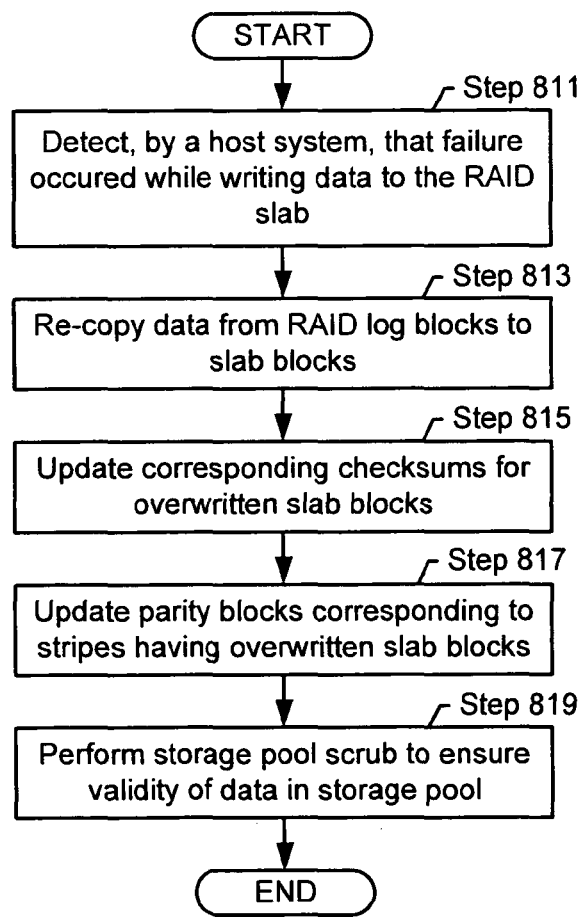

FIG. 8B shows a flowchart for recovering from failure in accordance with one or more embodiments of the invention. Specifically, FIG. 8B shows a flowchart for recovering from failure of the host system. For example, the failure may be a result of power failure. In Step 811, the host system detects that a failure occurred while writing the data to the RAID slab. In Step 813, then the data is re-copied from the RAID physical log blocks to the physical slab blocks. Specifically, the data being copied to the slab is re-performed from the beginning. In Step 815, the corresponding checksums are updated for the overwritten physical slab blocks. Specifically, the checksum is calculated for the updated physical slab blocks and stored in the corresponding checksum blocks.

Similarly, in Step 817, the parity blocks corresponding to the stripes having the overwritten physical slab blocks are updated. Specifically, the stripes having the updated physical slab blocks are identified. The physical slab blocks in the identified stripes are used to calculate parity data. The calculated parity data replaces the previous parity data in the parity block. In Step 819, a pool scrub may be performed to ensure the validity of data of the storage pool. Specifically, as a background process, the RAID log and the RAID slab may be checked to determine whether any errors exist. If errors exist, then the errors are corrected.

Figure 9:
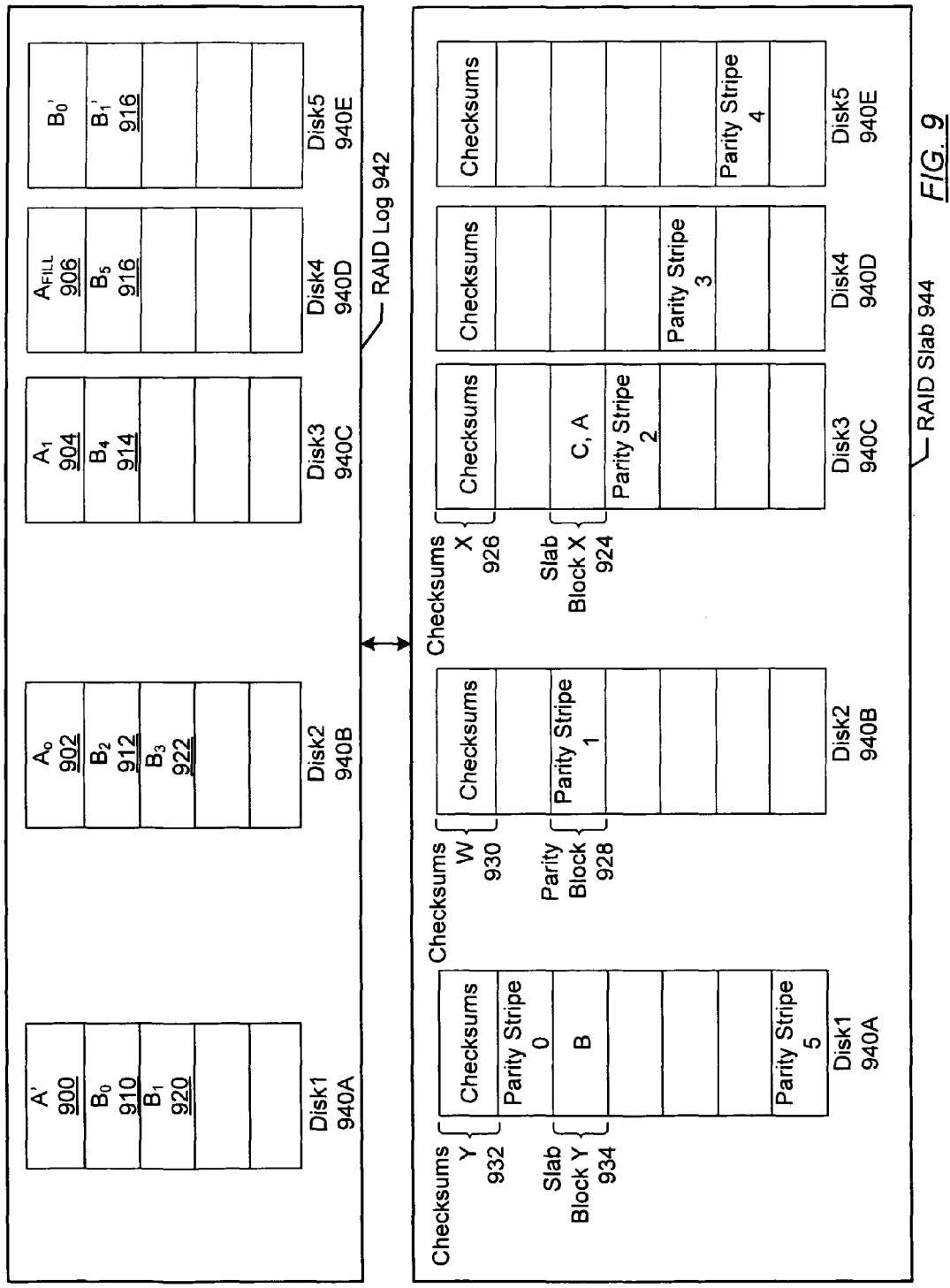
FIG. 9 shows an example in accordance with one or more embodiments of the invention.

FIG. 9 shows an example in accordance with one or more embodiments of the invention. The following example is for explanatory purposes only and not intended to limit the scope of the invention. Specifically, FIG. 9 shows five disks (i.e., Disk 1 (940A), Disk 2 (940B), Disk 3 (940C), Disk 4 (940D), Disk 5 (940E)) shared by a RAID log (942) and a RAID slab (944) in the storage pool. The parity block for a given set of physical log blocks may be written to any of the aforementioned disks. That is, the parity block for the physical log blocks may rotate amongst the multiple disks in the storage pool.

In FIG. 9, two blocks of data are stored namely, block A and block B, in accordance with one embodiment of the invention. Specifically, block A is divided in to two physical log blocks ($A_0$ (902) and $A_1$ (904)). Further, a single parity block ($A'$ (900)) is generated for block A using $A_0$ (902) and $A_1$ (904). As shown in FIG. 9, the parity block ($A'$ (900)) is written to the RAID log (942) first followed by the blocks that make up block A (i.e., $A_0$ (902) and $A_1$ (904)). In addition, in the modified RAID scheme, the allocated physical log blocks should be an even number, accordingly, because block A requires three physical log blocks (i.e., $A_0$ (902), $A_1$ (904), and $A'$ (900)) an additional padding block (i.e., $A_{FILL}$ (906)) must also be allocated.

Similar, block B is divided into six physical blocks (i.e., $B_0$ (910), $B_1$ (920), $B_2$ (912), $B_3$ (922), $B_4$ (914), $B_5$ (916)). Further, two parity blocks ($B'_0$ (908) and $B'_1$ (918)) are generated for the aforementioned physical blocks. Specifically, $B'_0$ (908) is generated using $B_0$ (910), $B_2$ (912), $B_4$ (914), $B_5$ (916) and $B'_1$ (918) is generated using $B_1$ (920) and $B_3$ (922). Note that the parity blocks (e.g., $B'_0$ (908)) for a given set of physical log blocks (e.g., $B_0$ (910), $B_2$ (912), $B_4$ (914), $B_5$ (916)) does not need to be on the same row as the set of physical log blocks. In one embodiment of the invention, all parity blocks for a given physical log block (e.g., ($B'_0$ (908) and $B'_1$ (918)) are located on the same disk.

Continuing with the example, during or after copying the logical block A and logical block B to the RAID log (942), the logical blocks are copied to the RAID slab (944). For the purposes of the example, consider the scenario in which a logical block C is stored in physical slab block X (924) prior to writing logical block A or logical block B to the storage pool. In the example, the SPA may allocate space after logical block C in physical slab block X (924) for logical block A. Accordingly, data is copied from $A_0$ (902) and $A_1$ (904) to physical slab block X (924). Further, the checksum corresponding to physical slab block X (924) is calculated and used to update the checksum block X (926) corresponding to physical slab block X (924). Similarly, the parity block (928) for parity stripe 1 having physical slab block X (924) is updated to reflect the new data. Further, the checksum corresponding to parity block (928) is calculated and used to update the checksum block W (930) corresponding to parity block (928). If failure occurs during writing of logical block A, the data may be re-copied from the RAID log (942), thereby preventing a write hole problem. Once the write of logical block A is successfully completed, the storage in the RAID log (942) allocated to logical block A is freed. Thus, other logical blocks may write over the storage space previously allocated to logical block A.

Similarly, during or after copying logical block A and logical block B to the RAID log (942), the logical block B is copied to the RAID slab (944). Specifically, the SPA may allocate space in physical slab block Y (934) for logical block B. Accordingly, data is copied from $B_0$ (910), $B_1$ (920), $B_2$ (912), $B_3$ (922), $B_4$ (914), and $B_5$ (916) to physical slab block Y (934). Further, the checksum corresponding to physical slab block Y (934) is calculated and used to update the checksum block Y (932) corresponding to physical slab block Y (934). Similarly, the parity block (928) for parity stripe 1 having physical slab block Y (934) is updated to reflect the new data. Further, the checksum corresponding to parity block (928) is calculated and used to update the checksum block W (930) corresponding to parity block (928). Once the write of logical block B is successfully completed, the storage allocated to logical block B is freed. Thus, other logical blocks may write over the storage space previously allocated to logical block B in the RAID log (942).

Figure 10:
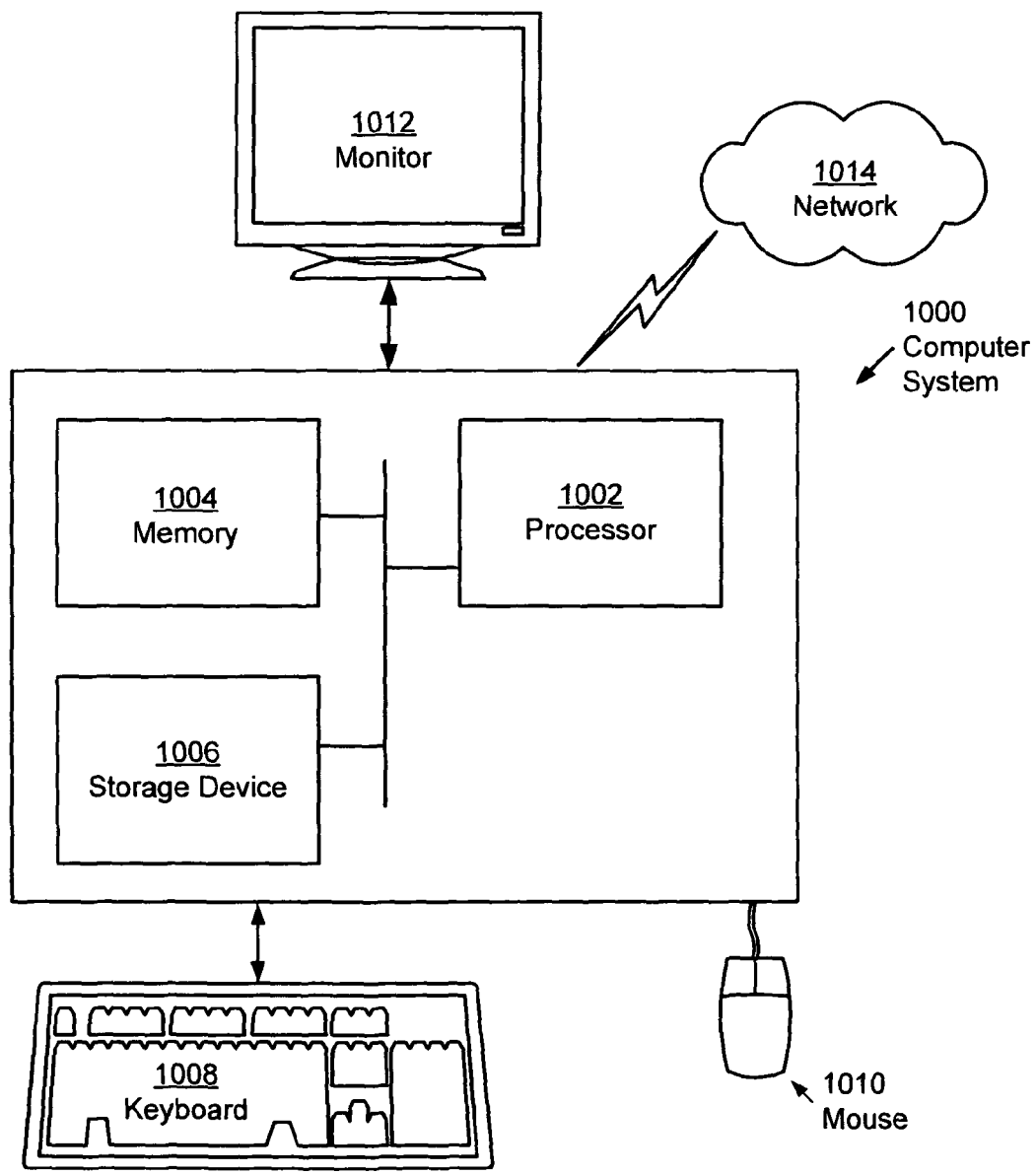
FIG. 10 shows a computer system in accordance with one or more embodiments of the invention.

Embodiments of the invention may be implemented on virtually any type of computer regardless of the platform being used. For example, as shown in FIG. 10, a computer system (1000) includes one or more processor(s) (1002), associated memory (1004) (e.g., random access memory (RAM), cache memory, flash memory, etc.), a storage device (1006) (e.g., a hard disk, an optical drive such as a compact disk drive or digital video disk (DVD) drive, a flash memory stick, etc.), and numerous other elements and functionalities typical of today's computers (not shown). In one or more embodiments of the invention, the processor (1002) is hardware. For example, the processor may be an integrated circuit. The computer system (1000) may also include input means, such as a keyboard (1008), a mouse (1010), or a microphone (not shown). Further, the computer system (1000) may include output means, such as a monitor (1012) (e.g., a liquid crystal display (LCD), a plasma display, or cathode ray tube (CRT) monitor). The computer system (1000) may be connected to a network (1014) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (1000) includes at least the minimal processing, input, and/or output means necessary to practice embodiments of the invention.

Software instructions in the form of computer readable program code to perform embodiments of the invention may be stored, in whole or in part, temporarily or permanently, on a computer readable medium such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s), is configured to perform embodiments of the invention.

Further, those skilled in the art will appreciate that one or more elements of the aforementioned computer system (1000) may be located at a remote location and connected to the other elements over a network. Further, embodiments of the invention may be implemented on a distributed system having a plurality of nodes, where each portion of the invention (e.g., RAID Slab, RAID log, SPA, DMU, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for writing a logical data block to storage, comprising:
   receiving a first request to write a logical data block to a storage pool;
   allocating a number of a first plurality of physical log blocks in a RAID log required to store the logical data block and a parity block for the logical data block, wherein the number of the first plurality of physical log blocks are less than a number of disks storing the RAID log;
   writing the logical data block and the parity block to the first plurality of physical log blocks in the RAID log;
   allocating space in a physical slab block in a RAID slab for the logical data block;
   copying data comprising the logical data block to the space in the physical slab block;
   updating, in the RAID slab, a checksum corresponding to the physical slab block based on the data copied to the physical slab blocks; and
   updating, in the RAID slab, a parity block corresponding to a data stripe comprising the physical slab block based on the data copied to the physical slab block.

2. The method of claim 1, further comprising:
   calculating a checksum of the logical data block;
   receiving a second request to write a logical indirect block to the storage pool, wherein the logical indirect block comprises the checksum and an address of the first plurality of physical log blocks;
   writing the logical indirect block to a second plurality of physical log blocks.

3. The method of claim 2, further comprising:
   updating the first logical indirect block after copying the data to the physical slab block.

4. The method of claim 1, wherein the space in the physical slab block is allocated prior to writing the logical data block and the parity block to the first plurality of physical log blocks.

5. The method of claim 1, further comprising:
   associating, with the space in the physical slab block, a reference to the first plurality of physical log blocks;
   identifying an address of the space in the physical slab block comprising the logical data block;
   calculating a checksum of the logical data block;
   receiving a second request to write a logical indirect block to the storage pool, wherein the logical indirect block comprises the checksum of the logical data block and the address of the space in the physical slab block; and
   writing the logical indirect block to a second plurality of physical log blocks.

6. The method of claim 1, further comprising:
   accessing a logical indirect block in the second plurality of physical log blocks to identify an address of the space in the physical slab block;
   determining that the space in the physical slab block is associated with the reference to the first plurality of physical log blocks; and
   accessing the first plurality of physical log blocks based on the reference to obtain the logical data block.

7. The method of claim 1, wherein the data is copied from the first plurality of physical log blocks.

8. The method of claim 7, wherein copying the data from the first plurality of physical log blocks to the space in the physical slab block comprises copying data from a second plurality of physical log blocks to the space in the physical slab block as a single transaction.

9. The method of claim 1, further comprising:
  detecting that a failure of the RAID slab occurred while copying data to the physical slab block from the first plurality of physical log blocks and updating the parity block corresponding to the data stripe comprising the physical slab block; and
  re-copy the data from the first plurality of physical log blocks based on the failure.

10. A system of a plurality of disks comprising:
  a RAID log comprising a plurality of physical log blocks, the RAID log configured to:
    store, in a number of first physical log blocks of the plurality of physical log blocks, a logical data block and a parity block for the logical data block, wherein the number of first physical log blocks required to store the logical data block and the parity block are less than a number of the plurality of disks storing the RAID log;
  a RAID slab comprising:
    a physical slab block configured to store the logical data block after the logical data block is copied to the RAID log and the physical slab block;
    a checksum corresponding to the physical slab block, wherein the checksum is updated for the physical slab block after the logical data block is copied to the physical slab block; and
    a parity block corresponding to a data stripe comprising the physical slab block, wherein the parity block is updated for the physical slab block after the logical data block is copied to the physical slab block.

11. The system of claim 10, wherein the RAID log is further configured to:
  store a logical indirect block in a number of second physical log blocks of the plurality of physical log blocks, wherein the logical indirect block comprises a checksum and an address of the first plurality of physical log blocks.

12. The system of claim 10, wherein the RAID log is further configured to:
  store a logical indirect block in a number of second physical log blocks of the plurality of physical log blocks,
  wherein the logical indirect block comprises a checksum of the logical data block and an address of the physical slab block prior to the logical data block being copied to the physical slab block, and
  wherein the physical slab block is associated with a reference to the first number of physical log blocks.

13. The system of claim 10, wherein the data is copied from the first plurality of physical log blocks, and wherein upon detecting that failure occurred of the RAID slab while copying the logical data block to the RAID slab, the logical data block is recopied from the first number of physical log blocks to the physical slab block.

14. The system of claim 10, wherein the logical data block and data in a second number of physical log blocks are copied to the physical slab block in a single transaction.

15. A non-transitory computer readable medium comprising computer readable program code embodied therein for:
  receiving a first request to write a logical data block to a storage pool;
  allocating a number of a first plurality of physical log blocks in a RAID log required to store a logical data block and a parity block for the logical data block, wherein the number of the first plurality of physical log blocks are less than a number of disks storing the RAID log;
  writing the logical data block and the parity block to the first plurality of physical log blocks in the RAID log;
  allocating space in a physical slab block in a RAID slab for the logical data block;
  copying data comprising the logical data block to the space in the physical slab block;
  updating, in the RAID slab, a checksum corresponding to the physical slab block based on the data copied to the physical slab blocks; and
  updating, in the RAID slab, a parity block corresponding to a data stripe comprising the physical slab block based on the data copied to the physical slab block.

16. The non-transitory computer readable medium of claim 15, further comprising computer readable program code embodied therein for:
  calculating a checksum of the logical data block;
  receiving a second request to write a logical indirect block to the storage pool, wherein the logical indirect block comprises the checksum and an address of the first plurality of physical log blocks;
  writing the logical indirect block to a second plurality of physical log blocks.

17. The non-transitory computer readable medium of claim 15, further comprising computer readable program code embodied therein for:
  updating the first logical indirect block after copying the data to the physical slab block.

18. The non-transitory computer readable medium of claim 15, wherein the space in the physical slab block is allocated prior to writing the logical data block and the parity block to the first plurality of physical log blocks.

19. The non-transitory computer readable medium of claim 15, further comprising computer readable program code embodied therein for:
  associating, with the space in the physical slab block, a reference to the first plurality of physical log blocks;
  identifying an address of the space in the physical slab block comprising the logical data block;
  calculating a checksum of the logical data block;
  receiving a second request to write a logical indirect block to the storage pool, wherein the logical indirect block comprises the checksum of the logical data block and the address of the space in the physical slab block; and
  writing the logical indirect block to a second plurality of physical log blocks.

20. The non-transitory computer readable medium of claim 15, further comprising computer readable program code embodied therein for:
  accessing a logical indirect block in the second plurality of physical log blocks to identify an address of the space in the physical slab block;
  determining that the space in the physical slab block is associated with the reference to the first plurality of physical log blocks; and
  accessing the first plurality of physical log blocks based on the reference to obtain the logical data block.

* * * * *

UNITED STATES PATENT AND TRADEMARK OFFICE
CERTIFICATE OF CORRECTION

PATENT NO. : 9,104,342 B2  
APPLICATION NO. : 13/880319  
DATED : August 11, 2015  
INVENTOR(S) : Bourbonnais et al.

It is certified that error appears in the above-identified patent and that said Letters Patent is hereby corrected as shown below:

Specification

In column 15, line 54, delete "panty" and insert -- parity --, therefor.

Signed and Sealed this  
Twenty-first Day of June, 2016

Michelle K. Lee  
*Director of the United States Patent and Trademark Office*